US009737048B2

United States Patent
Hofman et al.

(10) Patent No.: US 9,737,048 B2
(45) Date of Patent: *Aug. 22, 2017

(54) ARRANGEMENT OF MILKING BOX STALLS

(71) Applicant: TECHNOLOGIES HOLDINGS CORP., Houston, TX (US)

(72) Inventors: Henk Hofman, Lemmer (NL); Cor de Ruijter, Staphorst (NL); Menno Koekoek, Dronten (NL); Michael A. Mills, Houston, TX (US); Peter Willem van der Sluis, IJsselmuiden (NL)

(73) Assignee: Technologies Holdings Corp., Houston, TX (US)

( * ) Notice: Subject to any disclaimer, the term of this patent is extended or adjusted under 35 U.S.C. 154(b) by 28 days.

This patent is subject to a terminal disclaimer.

(21) Appl. No.: 14/963,314

(22) Filed: Dec. 9, 2015

(65) Prior Publication Data

US 2016/0088814 A1    Mar. 31, 2016

Related U.S. Application Data

(63) Continuation of application No. 14/727,984, filed on Jun. 2, 2015, now Pat. No. 9,282,720, which is a
(Continued)

(51) Int. Cl.
*A01J 5/00* (2006.01)
*A01K 1/12* (2006.01)
(Continued)

(52) U.S. Cl.
CPC .... *A01K 1/12* (2013.01); *A01J 5/00* (2013.01); *A01J 5/007* (2013.01); *A01J 5/0175* (2013.01)

(58) Field of Classification Search
CPC .... A01J 7/04; A01J 5/007; A01J 5/017; A01J 5/00; A01J 5/003; A01J 5/0175; A01K 1/126; A01K 1/12
(Continued)

(56) References Cited

U.S. PATENT DOCUMENTS

| 2,731,300 A | 1/1956 | Jansen | 299/111 |
| 2,830,559 A | 4/1958 | McMurray | 119/159 |

(Continued)

FOREIGN PATENT DOCUMENTS

| AT | 386 922 B | 11/1988 | A01J 7/00 |
| AT | 387 686 B | 2/1989 | A01J 5/01 |

(Continued)

OTHER PUBLICATIONS

PCT Notification of Transmittal of the International Search Report and the Written Opinion of the International Searching Authority for Application No. PCT/US2012/035356; 14 pages, Jul. 31, 2012.
(Continued)

*Primary Examiner* — Yvonne Abbott-Lewis
(74) *Attorney, Agent, or Firm* — Baker Botts L.L.P.

(57) ABSTRACT

A system includes includes a first milking box stall of a size sufficient to accommodate a first dairy livestock and a second milking box stall of a size sufficient to accommodate a second dairy livestock. The first and second milking box stalls face opposite directions. An equipment portion is located between the first milking box stall and the second milking box stall. A robotic attacher is housed in the equipment portion and configured to service both stalls at different times.

15 Claims, 14 Drawing Sheets

Related U.S. Application Data continuation of application No. 13/451,248, filed on Apr. 19, 2012, now Pat. No. 9,107,379, which is a continuation-in-part of application No. 13/095,983, filed on Apr. 28, 2011, now Pat. No. 9,107,378.

(51) Int. Cl.
*A01J 5/017* (2006.01)
*A01J 5/007* (2006.01)

(58) Field of Classification Search
USPC .......... 119/14.02, 14.08, 14.18, 14.03, 14.04
See application file for complete search history.

(56) References Cited

U.S. PATENT DOCUMENTS

| | | | |
|---|---|---|---|
| 3,174,457 A | 3/1965 | Lyttle et al. | 119/1 |
| 3,835,814 A | 9/1974 | Jacobs et al. | 119/14.04 |
| 4,306,454 A | 12/1981 | Olrik et al. | 73/224 |
| 4,508,058 A | 4/1985 | Jakobson et al. | 119/14.02 |
| 4,617,876 A | 10/1986 | Hayes | 119/155 |
| 4,726,322 A | 2/1988 | Torsius | 119/14.14 |
| 4,735,172 A | 4/1988 | Wahlström et al. | 119/14.1 |
| 4,819,875 A | 4/1989 | Beal | 239/97 |
| 4,867,103 A | 9/1989 | Montalescot et al. | 119/14.08 |
| 4,941,433 A | 7/1990 | Hanauer | 119/14.02 |
| 5,020,477 A | 6/1991 | Dessing et al. | 119/14.08 |
| 5,069,160 A | 12/1991 | Street et al. | 119/14.08 |
| 5,088,447 A | 2/1992 | Spencer et al. | 119/51.02 |
| 5,285,746 A | 2/1994 | Moreau | 119/14.03 |
| 5,379,721 A | 1/1995 | Dessing et al. | 119/14.08 |
| 5,479,876 A | 1/1996 | Street et al. | 119/14.08 |
| 5,553,569 A | 9/1996 | Street et al. | 119/525 |
| 5,596,945 A | 1/1997 | van der Lely | 119/14.03 |
| 5,666,903 A | 9/1997 | Bull et al. | 119/14.01 |
| 5,678,506 A | 10/1997 | van der Berg et al. | 119/14.18 |
| 5,718,185 A | 2/1998 | Pichler et al. | 119/14.04 |
| 5,722,343 A | 3/1998 | Aurik et al. | 119/14.02 |
| 5,784,994 A | 7/1998 | van der Lely | 119/14.08 |
| 5,816,190 A | 10/1998 | van der Lely | 119/14.08 |
| 5,862,776 A | 1/1999 | van den Berg | 119/14.1 |
| 5,918,566 A | 7/1999 | van den Berg | 119/14.02 |
| 5,934,220 A | 8/1999 | Hall et al. | 119/14.08 |
| 5,979,359 A | 11/1999 | Hansson | 119/14.08 |
| 6,050,219 A | 4/2000 | van der Lely | 119/14.08 |
| 6,055,930 A | 5/2000 | Stein et al. | 119/14.08 |
| 6,105,536 A | 8/2000 | DeWaard | 119/14.04 |
| 6,118,118 A | 9/2000 | van der Lely et al. | 250/221 |
| 6,167,839 B1 | 1/2001 | Isaksson et al. | 119/14.08 |
| 6,189,486 B1 | 2/2001 | Lindholm | 119/14.02 |
| 6,205,949 B1 | 3/2001 | van den Berg | 119/14.02 |
| 6,213,051 B1 | 4/2001 | Fransen | 119/14.08 |
| 6,227,142 B1 | 5/2001 | Birk | 119/14.08 |
| 6,234,109 B1 | 5/2001 | Andersson et al. | 119/14.08 |
| 6,257,169 B1 | 7/2001 | Oosterling | 119/14.02 |
| 6,321,682 B1 | 11/2001 | Eriksson et al. | 119/14.44 |
| 6,323,942 B1 | 11/2001 | Bamji | 356/5.01 |
| 6,341,575 B1 | 1/2002 | Forsén | 119/14.08 |
| 6,363,883 B1 | 4/2002 | Birk | 119/14.08 |
| 6,401,654 B1 | 6/2002 | Hallsten et al. | 119/14.18 |
| 6,443,094 B1 | 9/2002 | DeWaard | 119/14.18 |
| 6,450,118 B1 | 9/2002 | Eppers | |
| 6,532,892 B1 | 3/2003 | Nilsson | 119/14.03 |
| 6,543,381 B1 | 4/2003 | Birk et al. | 119/14.08 |
| 6,553,942 B1 | 4/2003 | Eriksson | 119/670 |
| 6,568,352 B2 | 5/2003 | Fransen | 119/668 |
| 6,591,784 B1 | 7/2003 | Eriksson | 119/670 |
| 6,626,130 B1 | 9/2003 | Eriksson | 119/670 |
| 6,729,262 B2 | 5/2004 | Ealy et al. | 119/14.08 |
| 6,814,026 B2 | 11/2004 | Guo | |
| 6,864,914 B1 | 3/2005 | Birk | 348/211.99 |
| 6,974,373 B2 | 12/2005 | Kriesel | 452/157 |
| 6,976,644 B2 | 12/2005 | Troudt | 239/587.1 |
| 7,039,220 B2 | 5/2006 | Kriesel | 382/110 |
| 7,128,020 B2 | 10/2006 | Björk et al. | 119/14.18 |
| 7,146,928 B2 | 12/2006 | Ealy et al. | 119/14.08 |
| 7,246,571 B2 | 7/2007 | Van Den Berg et al. | 119/14.08 |
| 7,299,766 B2 | 11/2007 | Van Den Berg et al. | 119/14.02 |
| 7,377,232 B2 | 5/2008 | Holmgren et al. | 119/670 |
| 7,690,327 B2 | 4/2010 | Van Den Berg | 119/14.02 |
| 7,882,802 B2 | 2/2011 | Van Den Berg et al. | 119/14.08 |
| 8,036,429 B2 | 10/2011 | Doyle, II | 382/110 |
| 8,074,600 B2 | 12/2011 | Källen et al. | 119/14.04 |
| 8,210,122 B2 | 7/2012 | Pettersson et al. | 119/14.08 |
| 2001/0024514 A1 | 9/2001 | Matsunaga | 382/106 |
| 2002/0108576 A1 | 8/2002 | Lely et al. | 119/14.02 |
| 2003/0097990 A1 | 5/2003 | Bjork et al. | 119/14.08 |
| 2003/0140860 A1 | 7/2003 | Guo | |
| 2004/0032974 A1 | 2/2004 | Kriesel | |
| 2004/0103846 A1 | 6/2004 | Fransen | 119/14.03 |
| 2005/0223997 A1 | 10/2005 | Umegard | 119/14.03 |
| 2006/0196431 A1 | 9/2006 | Kaever et al. | 119/14.04 |
| 2007/0137579 A1 | 6/2007 | Osthues et al. | 119/14.03 |
| 2007/0245964 A1 | 10/2007 | Van Den Berg et al. | 119/14.08 |
| 2007/0277737 A1 | 12/2007 | Maier et al. | 119/14.45 |
| 2008/0202432 A1 | 8/2008 | Petterson | 119/14.03 |
| 2010/0031889 A1 | 2/2010 | Eriksson et al. | 119/14.02 |
| 2010/0095893 A1 | 4/2010 | Kallen et al. | 119/14.04 |
| 2010/0186675 A1 | 7/2010 | Van Den Berg | 119/14.03 |
| 2010/0282172 A1 | 11/2010 | Eriksson et al. | 119/14.02 |
| 2010/0289649 A1 | 11/2010 | Holmgren et al. | 340/573.3 |
| 2011/0114024 A1 | 5/2011 | Van Den Berg | 119/14.02 |
| 2011/0239945 A1 | 10/2011 | Van Den Berg | 119/14.02 |
| 2012/0000427 A1 | 1/2012 | Nilsson | 119/14.02 |
| 2012/0006269 A1 | 1/2012 | McCain et al. | 119/14.02 |
| 2012/0048207 A1 | 3/2012 | Hofman et al. | 119/651 |
| 2012/0048208 A1 | 3/2012 | Hofman et al. | 119/651 |
| 2012/0180729 A1 | 7/2012 | Van Dorp | 119/14.08 |
| 2014/0331934 A1* | 11/2014 | Eriksson | A01K 1/126 119/14.04 |
| 2016/0183493 A1* | 6/2016 | Waybright | A01K 1/12 119/14.02 |

FOREIGN PATENT DOCUMENTS

| | | | | |
|---|---|---|---|---|
| AT | 404 537 B | 12/1998 | | A01J 7/04 |
| AT | 406 108 B | 2/2000 | | A01J 5/00 |
| AU | 2005222545 A1 | 11/2005 | | A01J 5/017 |
| CA | 1 253 956 | 5/1989 | | A01J 7/00 |
| CA | 2 313 533 A1 | 6/1999 | | G06T 1/00 |
| CA | 2 315 018 A1 | 7/1999 | | G06T 1/00 |
| DE | 37 42 867 A1 | 7/1989 | | A01J 5/017 |
| DE | 39 38 077 A1 | 5/1991 | | A01J 5/017 |
| DE | 689 19 414 T3 | 5/1995 | | A01J 5/017 |
| DE | 691 16 926 T2 | 11/1996 | | A01J 5/017 |
| DE | 196 36 551 A1 | 3/1998 | | A01J 5/017 |
| DE | 689 28 489 T2 | 4/1998 | | A01J 5/00 |
| DE | 38 75 414 T3 | 8/1999 | | A01J 5/00 |
| DE | 691 32 321 T2 | 2/2001 | | A01J 5/017 |
| DE | 102 12 676 C1 | 3/2002 | | A01K 1/12 |
| DK | 144542 B | 5/1980 | | A01J 7/00 |
| DK | 147721 B | 7/1981 | | A01J 5/04 |
| DK | 218482 A | 11/1983 | | A01J 5/10 |
| DK | 328482 A | 1/1984 | | A01J 7/00 |
| DK | 169247 B1 | 9/1994 | | A01J 5/00 |
| DK | 173139 B1 | 6/1998 | | A01J 5/04 |
| EP | 0 188 303 A1 | 7/1986 | | A01J 7/00 |
| EP | 0 209 202 A1 | 1/1987 | | A01J 7/00 |
| EP | 0 229 682 A1 | 7/1987 | | A01J 7/00 |
| EP | 0 232 568 A1 | 8/1987 | | G01S 15/88 |
| EP | 0 119 222 B1 | 4/1988 | | A01J 5/04 |
| EP | 0 300 582 A1 | 1/1989 | | A01J 7/00 |
| EP | 0 306 579 A1 | 3/1989 | | A01J 5/017 |
| EP | 0 309 036 A1 | 3/1989 | | A01J 7/00 |
| EP | 0 327 037 A2 | 8/1989 | | A01M 7/00 |
| EP | 0 329 248 A1 | 8/1989 | | A01J 7/00 |
| EP | 0 349 019 A2 | 1/1990 | | A01J 5/08 |
| EP | 0 360 354 AI | 3/1990 | | A01J 7/00 |
| EP | 0 432 148 A2 | 6/1991 | | A01K 1/12 |
| EP | 0 440 313 A2 | 8/1991 | | G01S 15/42 |
| EP | 0 448 132 A2 | 9/1991 | | A01J 7/00 |
| EP | 0 455 305 A1 | 11/1991 | | G01S 7/48 |
| EP | 0 467 489 A1 | 1/1992 | | A01J 7/00 |
| EP | 0 472 247 A2 | 2/1992 | | A01J 7/00 |

(56) References Cited

FOREIGN PATENT DOCUMENTS

| | | | |
|---|---|---|---|
| EP | 0 479 397 A2 | 4/1992 | ............... A01J 7/00 |
| EP | 0 511 722 A2 | 11/1992 | ............... A01D 7/00 |
| EP | 0 511 723 A2 | 11/1992 | ............... A01D 7/00 |
| EP | 0 516 246 A2 | 12/1992 | ............... A01D 7/00 |
| EP | 0 541 517 A2 | 5/1993 | ............... A01J 7/00 |
| EP | 0 545 916 A2 | 6/1993 | ............... A01J 7/00 |
| EP | 0 548 058 A2 | 6/1993 | ............... A01K 1/12 |
| EP | 0 553 940 A2 | 8/1993 | ............... A01J 7/00 |
| EP | 0 565 189 A2 | 10/1993 | ............... A01J 7/00 |
| EP | 0 574 089 A2 | 12/1993 | ............... G01S 7/48 |
| EP | 0 630 558 A2 | 12/1994 | ............... A01J 7/00 |
| EP | 0 634 097 A1 | 1/1995 | ............... A01K 1/12 |
| EP | 0 643 907 A2 | 3/1995 | ............... A01J 7/00 |
| EP | 0 688 498 A2 | 12/1995 | ............... A01J 7/00 |
| EP | 0 689 762 A1 | 1/1996 | ............... A01K 1/12 |
| EP | 0 779 025 A2 | 6/1997 | ............... A01J 5/017 |
| EP | 0 789 995 A1 | 8/1997 | ............... A01J 7/04 |
| EP | 0 824 857 A1 | 2/1998 | ............... A01J 5/017 |
| EP | 0 880 889 A2 | 12/1998 | ............... A01J 5/017 |
| EP | 0 900 522 A1 | 3/1999 | ............... A01J 5/017 |
| EP | 0 951 651 B1 | 10/1999 | ............... G01S 17/00 |
| EP | 1 089 614 B1 | 4/2001 | ............... A01J 7/02 |
| EP | 1 211 928 B1 | 6/2002 | ............... A01J 5/017 |
| EP | 1 253 440 A1 | 10/2002 | ............... G01S 7/481 |
| EP | 1 316 253 A2 | 11/2002 | ............... A01K 1/12 |
| EP | 1 279 327 A2 | 1/2003 | ............... A01J 5/017 |
| EP | 1 388 281 A1 | 2/2004 | ............... A01J 7/02 |
| EP | 1 447 002 A1 | 8/2004 | ............... A01J 5/017 |
| EP | 1 460 453 A1 | 9/2004 | ............... G01S 17/89 |
| EP | 1 520 468 A1 | 4/2005 | ............... A01J 7/04 |
| EP | 1 537 774 A1 | 6/2005 | ............... A01J 5/017 |
| EP | 1 537 775 A1 | 6/2005 | ............... A01J 5/017 |
| EP | 1 523 882 A2 | 3/2009 | ............... A01K 1/12 |
| ES | 2 064 892 T3 | 2/1995 | ............... A01J 5/017 |
| FI | 88099 B | 12/1992 | ............... A01J 7/00 |
| FI | 20002169 A | 4/2002 | ............... A01J 5/01 |
| FR | 2 595 197 A1 | 9/1987 | ............... A01J 5/017 |
| GB | 2 184 233 A | 6/1987 | ............. G01N 21/89 |
| GB | 2 218 888 A | 11/1989 | ............... A01J 7/00 |
| GB | 2258382 | 6/1992 | |
| JP | 62-159078 A | 7/1987 | ............... A01J 5/00 |
| JP | 9-196631 A | 7/1997 | ............. G01B 11/00 |
| JP | 9-243315 A | 9/1997 | ............... A01J 5/00 |
| JP | 9-275834 A | 10/1997 | ............... A01J 5/00 |
| JP | 9-285234 A | 11/1997 | ............... A01J 5/00 |
| JP | 11-276002 A | 10/1999 | ............... A01J 5/00 |
| JP | 11-281340 A | 10/1999 | ............... A01J 5/00 |
| JP | 2001-504944 A | 4/2001 | ............... A01J 5/00 |
| JP | 2002-521007 A | 7/2002 | ............... A01J 5/00 |
| JP | 2002-253075 A | 9/2002 | ............... A01J 5/00 |
| NL | 8502039 A | 2/1987 | ............... A01J 5/017 |
| NL | 8503580 A | 7/1987 | ............... A01J 5/00 |
| NL | 8600076 A | 8/1987 | ............... A01J 5/00 |
| NL | 8602699 A | 5/1988 | ............... A01J 5/017 |
| NL | 8800042 A | 8/1989 | ............... A01J 5/017 |
| NL | 8801785 A | 2/1990 | ............... A01J 5/017 |
| NL | 9101088 A | 1/1993 | ............... A01J 7/00 |
| NL | 9201434 A | 3/1994 | ............... A01J 5/017 |
| NL | 9201902 A | 6/1994 | ............... A01J 5/017 |
| NL | 9400220 A | 9/1995 | ............... A01J 5/017 |
| NL | 9400471 A | 11/1995 | ............... A01J 5/017 |
| NL | 9500276 A | 9/1996 | ............... A01J 5/017 |
| NL | 9500277 A | 9/1996 | ............... A01J 5/017 |
| NL | 9500363 A | 10/1996 | ............... A01J 5/017 |
| NL | 9500566 A | 11/1996 | ............... A01J 5/01 |
| NL | 1 009 632 C2 | 7/1998 | ............... A01J 5/017 |
| NL | 1006804 C2 | 2/1999 | ............... A01J 5/00 |
| NL | 1009711 C2 | 1/2000 | ............... A01J 5/00 |
| NL | 1013026 C2 | 3/2001 | ............... A01J 5/017 |
| NL | 1018563 C1 | 1/2003 | ............... A01J 5/017 |
| SE | 419 901 B | 8/1981 | ............... A01J 7/00 |
| SE | 425 821 B | 11/1982 | ............... A01J 7/00 |
| SE | 433 553 B | 6/1984 | ............... A01J 5/10 |
| SE | 512 334 C2 | 2/2000 | ............... A01J 5/017 |
| WO | WO 96/20587 A1 | 7/1996 | ............... A01J 5/017 |
| WO | WO 97/15183 A1 | 5/1997 | ............... A01J 5/017 |
| WO | WO 97/15901 A1 | 5/1997 | ............... G06T 7/00 |
| WO | WO 97/37528 A1 | 10/1997 | ............... A01J 5/017 |
| WO | WO 98/01022 A1 | 1/1998 | ............... A01J 5/017 |
| WO | WO 98/35547 A1 | 8/1998 | ............... A01J 5/017 |
| WO | WO 98/44782 A1 | 10/1998 | ............... A01J 5/017 |
| WO | WO 98/45808 A1 | 10/1998 | ............... G06T 1/00 |
| WO | WO 98/47348 A1 | 10/1998 | ............... A01J 5/017 |
| WO | WO 99/09430 A2 | 2/1999 | ............... G01S 17/00 |
| WO | WO 99/30277 A1 | 6/1999 | ............... G06T 1/00 |
| WO | WO 99/33020 A1 | 7/1999 | ............... G06T 1/00 |
| WO | WO 00/04763 A1 | 2/2000 | ............... A01J 5/017 |
| WO | WO 00/04765 A1 | 2/2000 | ............... A01J 5/017 |
| WO | WO 00/11935 A1 | 3/2000 | ............... A01J 5/017 |
| WO | WO 00/11936 A1 | 3/2000 | ............... A01J 5/017 |
| WO | WO 00/11940 A1 | 3/2000 | ............... A01K 11/00 |
| WO | WO 00/62602 A1 | 10/2000 | ............... A01J 5/017 |
| WO | WO 01/19171 A1 | 3/2001 | ............... A01J 5/017 |
| WO | WO 01/19172 A1 | 3/2001 | ............... A01J 5/017 |
| WO | WO 01/52633 A1 | 7/2001 | ............... A01J 5/017 |
| WO | WO 02/00011 A1 | 1/2002 | ............... A01J 5/017 |
| WO | WO 02/07098 A1 | 1/2002 | ............... G06T 7/00 |
| WO | WO 02/15676 A1 | 2/2002 | ............... A01J 5/017 |
| WO | WO 02/082201 A1 | 10/2002 | ............... G05D 1/02 |
| WO | WO 03/055297 A1 | 7/2003 | ............... A01J 5/017 |
| WO | WO 2005/015985 A2 | 2/2005 | |
| WO | WO 2006/038840 A1 | 4/2006 | ............... A01K 1/12 |
| WO | WO 2007/050012 A1 | 5/2007 | ............... A01J 5/017 |
| WO | WO2008/030086 | 8/2007 | |
| WO | WO 2008/030116 A1 | 3/2008 | ............... A01K 1/12 |
| WO | WO 2008/058723 A1 | 5/2008 | ............... A01J 7/02 |
| WO | WO 2008/118068 A1 | 10/2008 | ............... A01K 1/12 |
| WO | WO 2009/093965 A1 | 7/2009 | ............... A01J 5/017 |
| WO | WO 2010/012625 A2 | 2/2010 | ............... A01J 5/017 |
| WO | WO 2010/014002 A9 | 2/2010 | ............... A01K 1/12 |
| WO | WO 2010/046669 A1 | 4/2010 | ............... A01J 5/017 |
| WO | WO 2010/110663 A1 | 9/2010 | ............... A01J 5/017 |
| WO | WO 2010/119079 A2 | 10/2010 | ............... A01K 1/12 |
| WO | WO 2011/098454 A1 | 8/2011 | ............... A01K 1/12 |
| WO | WO 2011/098994 A2 | 8/2011 | ............... A01J 5/017 |
| WO | WO 2011/102717 A1 | 8/2011 | ............... A01K 1/12 |
| WO | WO 2011/117386 A2 | 9/2011 | ............... A01J 5/00 |

OTHER PUBLICATIONS

U.S. Appl. No. 13/095,983, filed Apr. 28, 2011, Henk Hofman.
U.S. Appl. No. 13/095,994, filed Apr. 28, 2011, Henk Hofman.
U.S. Appl. No. 13/448,751, filed Apr. 17, 2012, Henk Hofman.
U.S. Appl. No. 13/448,799, filed Apr. 17, 2012, Henk Hofman.
U.S. Appl. No. 13/448,840, filed Apr. 17, 2012, Henk Holman.
U.S. Appl. No. 13/448,873, filed Apr. 17, 2012, Henk Hofman.
U.S. Appl. No. 13/448,882, filed Apr. 17, 2012, Henk Hofman.
U.S. Appl. No. 13/448,897, filed Apr. 17, 2012, Henk Hofman.
U.S. Appl. No. 13/448,913, filed Apr. 17, 2012, Henk Hofman.
U.S. Appl. No. 13/448,929, filed Apr. 17, 2012, Henk Hofman.
U.S. Appl. No. 13/448,951, filed Apr. 17, 2012, Henk Hofman.
U.S. Appl. No. 13/448,993, filed Apr. 17, 2012, Henk Haman.
U.S. Appl. No. 13/449,002, filed Apr. 17, 2012, Henk Hofman.
U.S. Appl. No. 13/449,056, filed Apr. 17, 2012, Henk Hofinan.
U.S. Appl. No. 13/449,105, filed Apr. 17, 2012, Henk Hofman.
U.S. Appl. No. 13/449,142, filed Apr. 17, 2012, Henk Hofman.
U.S. Appl. No. 13/449,162, filed Apr. 17, 2012, Henk Hofman.
U.S. Appl. No. 13/449,173, filed Apr. 17, 2012, Henk Hofman.
U.S. Appl. No. 13/449,951, filed Apr. 18, 2012, Henk Hofman.
U.S. Appl. No. 13/454,281, filed Apr. 24, 2012, Henk Hofman.
U.S. Appl. No. 13/454,298, filed Apr. 24, 2012, Henk Hofman.
U.S. Appl. No. 13/454,351, filed Apr. 24, 2012, Henk Hofman.
U.S. Appl. No. 13/454,386, filed Apr. 24, 2012, Henk Hofman.
U.S. Appl. No. 13/454,490, filed Apr. 24, 2012, Henk Hofman.
U.S. Appl. No. 13/454,670, filed Apr. 24, 2012, Henk Hofman.
U.S. Appl. No. 13/454,716, filed Apr. 24, 2012, Henk Hofrnan.
U.S. Appl. No. 13/454,833, filed Apr. 24, 2012, Henk Hofman.
U.S. Appl. No. 13/454,876, filed Apr. 24, 2012, Henk Hofman.
U.S. Appl. No. 13/454,913, filed Apr. 24, 2012, Henk Hofman.
U.S. Appl. No. 13/454,953, filed Apr. 24, 2012, Henk Hofman.
U.S. Appl. No. 13/454,975, filed Apr. 24, 2012, Henk Hofman.

(56) References Cited

OTHER PUBLICATIONS

Jan W. Weingarten, et al.; *A State-of-the-Art 3D Sensor for Robot Navigation*; 6 pages, Sep. 2004.
PCT International Patent Application No. PCT/NL2010/050154 entitled *Robot and Method for Milking a Cow by this Robot*; 19 pages, Mar. 25, 2010.
PCT Notification of Transmittal of the International Search Report and the Written Opinion of the International Searching Authority for Application No. PCT/US2011/047510; 9 pages, Jan. 2, 2012.
PCT Notification of Transmittal of the International Search Report and the Written Opinion of the International Searching Authority for Application No. PCT/US2011/047511; 9 pages, Jan. 2, 2012.
PCT Invitation to Pay Additional Fees and, Where Applicable, Protest Fee and Partial National Search Report for Application No. PCT/US2012/035074; 7 pages, Jul. 16, 2012.
PCT Notification of Transmittal of the International Search Report and the Written Opinion of the International Searching Authority for Application No. PCT/US2012/033894; 11 pages, Jul. 23, 2012.
PCT Invitation to Pay Additional Fees and, Where Applicable, Protest Fee and Partial National Search Report for Application No. PCT/US2012/035077; 7 pages, Jul. 25, 2012.
PCT Invitation to Pay Additional Fees and, Where Applicable, Protest Fee and Partial National Search Report for Application No. PCT/US2012/035079; 8 pages, Jul. 31, 2012.
PCT Notification of Transmittal of the International Search Report and the Written Opinion of the International Searching Authority for Application No. PCT/US2012/033892; 13 pages, Jul. 31, 2012.
PCT Invitation to Pay Additional Fees and, Where Applicable, Protest Fee and Partial National Search Report for Application No. PCT/US2012/035107; 7 pages, Jul. 31, 2012.
Canadian Intellectual Property Office; Office Action for Application No. 2,775,132; 3 pages, Aug. 20, 2012.
Canadian Intellectual Property Office; Office Action for Application No. 2,775,130; 2 pages, Aug. 20, 2012.
Canadian Intellectual Property Office; Office Action for Application No. 2,775,169; 3 pages, Aug. 20, 2012.
Canadian Intellectual Property Office; Office Action for Application No. 2,775,177; 2 pages, Aug. 20, 2012.
Canadian Intellectual Property Office; Office Action for Application No. 2,775,252; 3 pages, Aug. 21, 2012.
Canadian Intellectual Property Office; Office Action for Application No. 2,783,887; 2 pages, Oct. 1, 2012.
Canadian Intellectual Property Office; Office Action for Application No. 2,784,070; 3 pages, Oct. 1, 2012.
PCT Notification of Transmittal of the International Search Report and the Written Opinion of the International Searching Authority for International Application No. PCT/US2012/035107; 28 pages, Oct. 16, 2012.
Canadian Intellectual Property Office; Office Action for Application No. 2,775,252; 3 pages, Nov. 29, 2012.
Canadian Intellectual Property Office; Office Action for Application No. 2,775,130; 4 pages, Nov. 27, 2012.
Canadian Intellectual Property Office; Office Action for Application No. 2,775,177; 3 pages, Nov. 27, 2012.
Canadian Intellectual Property Office; Office Action for Application No. 2,829,656, file ref. No. 502610-CA-B (3 pgs), Nov. 28, 2014 (Nov. 28, 2014).
European Patent Office Communication pursuant to Article 94(3) EPC; Application No. 12 718 865.4-1655, Ref. THC 021 PCT/EP (7 pgs), Nov. 24, 2014 (Nov. 24, 2014).
Canadian Intellectual Property Office Action, Application No. 2,924,285, 5 pages, Jan. 3, 2017.
European Patent Office "Communication pursuant to Article 94(3) EPC", Application No. 12 718 850.6-1655, 5 pages, May 25, 2016.

\* cited by examiner

ARRANGEMENT OF MILKING BOX STALLS

RELATED APPLICATION

This application is a continuation of pending U.S. patent application Ser. No. 14/727,984 filed Jun. 2, 2015 which is a continuation of U.S. Ser. No. 13/451,248 filed Apr. 19, 2012, which is now U.S. Pat. No. 9,107,379 issued Aug. 18, 2015, which is a continuation-in-part application of pending U.S. patent application Ser. No. 13/095,983 entitled "Milking Box With Robotic Attacher," filed Apr. 28, 2011, which is now U.S. Pat. No. 9,107,378 issued Aug. 18, 2015.

TECHNICAL FIELD

This invention relates generally to dairy farming and more particularly to arrangements of milking box stalls.

BACKGROUND OF THE INVENTION

Over time, the size and complexity of dairy milking operations has increased. Accordingly, the need for efficient and scalable systems and methods that support dairy milking operations has also increased. Systems and methods supporting dairy milking operations, however, have proven inadequate in various respects.

SUMMARY OF THE INVENTION

According to embodiments of the present disclosure, disadvantages and problems associated with previous systems supporting dairy milking operations may be reduced or eliminated.

In certain embodiments, a system includes a first milking box stall of a size sufficient to accommodate a dairy livestock. The system also includes an equipment portion located adjacent to the first milking box stall. The equipment portion houses a robotic attacher. The system also includes a second milking box stall of a size sufficient to accommodate a dairy livestock. The second milking box stall is located adjacent to the equipment portion. The robotic attacher is configured to service both the first milking box stall and the second milking box stall by extending between the rear legs of a dairy livestock located within either stall in order to attach milking equipment to the dairy livestock.

In one embodiment, a system includes a first milking box stall of a size sufficient to accommodate a dairy livestock. The system also includes a second milking box stall of a size sufficient to accommodate a dairy livestock. The second milking box stall is spaced apart from the first milking box stall. The first and second milking box stalls face opposite directions. The system also includes an equipment portion located between the first milking box stall and the second milking box stall. The equipment portion houses a robotic attacher. The robotic attacher is configured to pivot, move laterally, and/or move backward and forward between the first milking box stall and the second milking box stall in order to service both stalls.

In another embodiment, a system includes a first milking box stall of a size sufficient to accommodate a dairy livestock. The system also includes a second milking box stall of a size sufficient to accommodate a dairy livestock. The second milking box stall is located adjacent to the first milking box stall. The first and second milking box stalls face the same direction. The system also includes a third milking box stall of a size sufficient to accommodate a dairy livestock. The third milking box stall is spaced apart from the first milking box stall. The first and third milking box stalls face opposite directions. The system also includes an equipment portion located between the first and second milking box stalls and the third milking box stall. The equipment portion houses a robotic attacher. The robotic attacher is configured to pivot, move laterally, and/or move backward and forward between the first milking box stall, the second milking box stall, and the third milking box stall in order to service all three stalls.

In another embodiment, a system includes a first milking box stall of a size sufficient to accommodate a dairy livestock. The system also includes a second milking box stall of a size sufficient to accommodate a dairy livestock. The second milking box stall is space apart from the first milking box stall. The first and second milking box stalls face opposite directions. The system also includes a third milking box stall of a size sufficient to accommodate a dairy livestock. The third milking box stall is located near the first and second milking box stalls. The first and third milking box stalls face perpendicular directions. The system also includes a fourth milking box stall. The fourth milking box stall is located near the first and second milking box stalls, and spaced apart from the third milking box stall. The third and fourth milking box stalls face opposite directions. The system also includes an equipment portion located between the first, second, third, and fourth milking box stalls. The equipment portion houses a robotic attacher. The robotic attacher is configured to pivot, move laterally, and/or move backward and forward between the first milking box stall, the second milking box stall, the third milking box stall, and the fourth milking box stall in order to service all four stalls.

Particular embodiments of the present disclosure may provide one or more technical advantages. For example, in certain embodiments, the system of the present disclosure includes a robotic attacher configured to service multiple milking box stalls. As a result, the cost associated with the milking boxes may be less than that of milking boxes that use a separate milking robot for each milking box. As another example, in certain embodiments, the system of the present disclosure includes a robotic attacher positioned to the rear of a milking box housing a dairy cow being milked rather than to the side of the milking box. The robotic attacher being positioned to the rear of a milking box may allow two milking boxes to be positioned side-by-side such that the robotic attacher may attach milking equipment to dairy cows located in each of the milking boxes. As a result, the cost associated with the milking boxes may be less than that of milking boxes that use a milking robot for each milking box. Moreover, the robotic attacher being positioned to the rear of a milking box may allow for gates to be positioned on each side of the milking box. As a result, a dairy cow may enter or exit the milking box on either side, allowing for increased sorting capabilities.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1A:
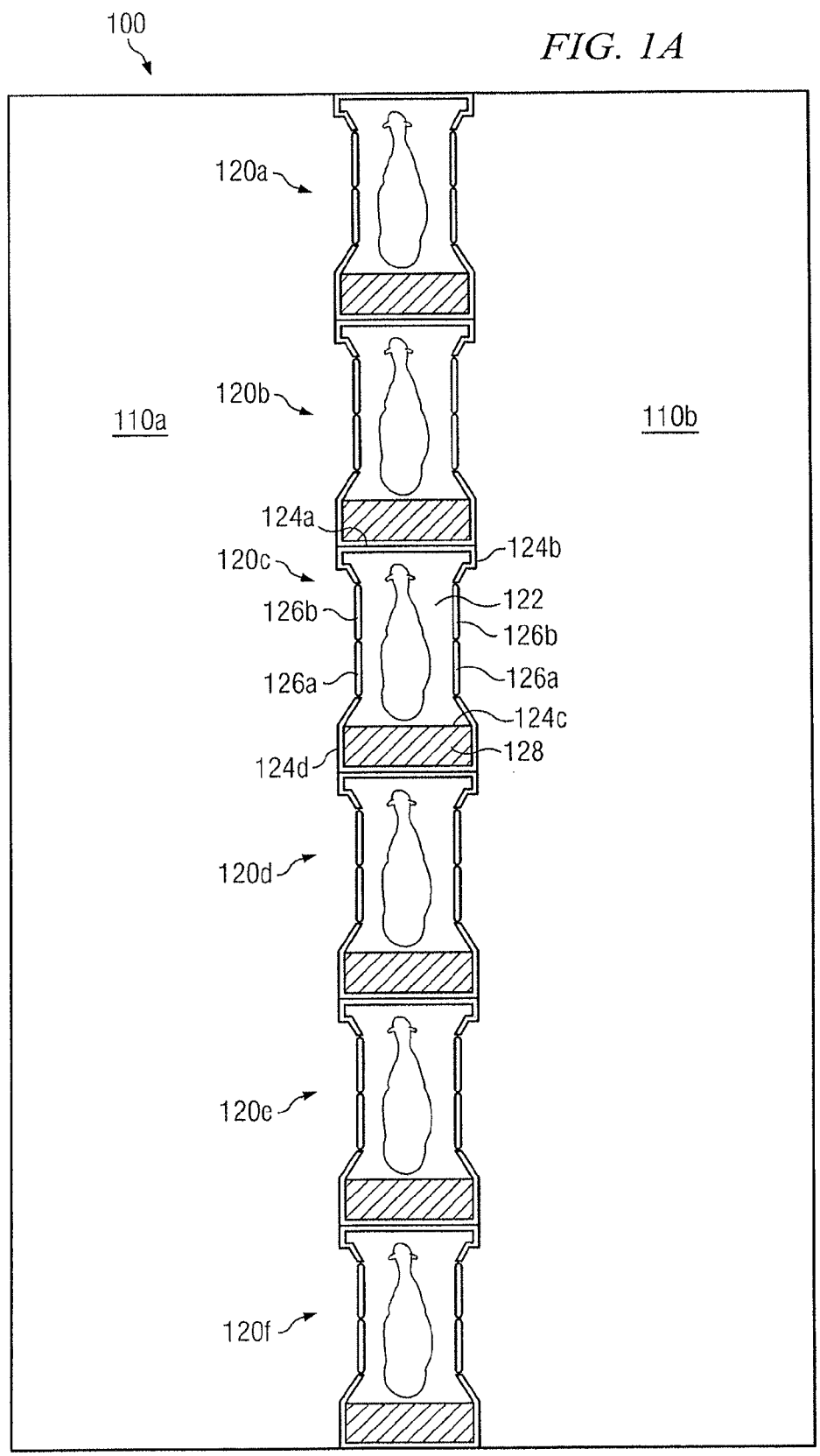
FIGS. 1A-1B illustrate example configurations of an enclosure in which one or more milking boxes are installed, according to certain embodiments of the present disclosure.

FIG. 1 illustrates example configurations of an enclosure 100 in which one or more milking boxes 120 are installed, according to certain embodiments of the present disclosure. Enclosure 100 may be divided into a number of regions 110 (e.g., regions 110a and 110b), and each region 110 may include resting stalls, feeding troughs, walking paths, and/or other structure suitable for housing dairy livestock. Although the present disclosure contemplates enclosure 100 as housing any suitable dairy livestock (e.g., dairy cows, goats, sheep, water buffalo, etc.), the remainder of this description is detailed with respect to dairy cows.

Each milking box 120 may include a stall portion 122 configured to house a dairy cow being milked. The stall portion 122 of each milking box 120 may be defined by a number of walls 124, each of which may each be constructed from any suitable materials arranged in any suitable configuration operable to maintain a dairy cow within stall portion 122 during milking. In certain embodiments, stall portion 122 of milking box 120 may include walls 124a, 124b, 124c, and 124d. For purposes of illustration, wall 124a may be designated as the front of milking box 120 such that the head of a dairy cow being milked would be facing wall 124a. Wall 124c may be positioned opposite wall 124a and may be designated as the rear of milking box 120. Walls 124b and 124d may each form a side extending between the front and rear of milking box 120. Walls 124a, 124b, 124c, and 124d may be spaced apart a suitable distance to ensure the comfort of the dairy cow within stall portion 122.

Figure 2:
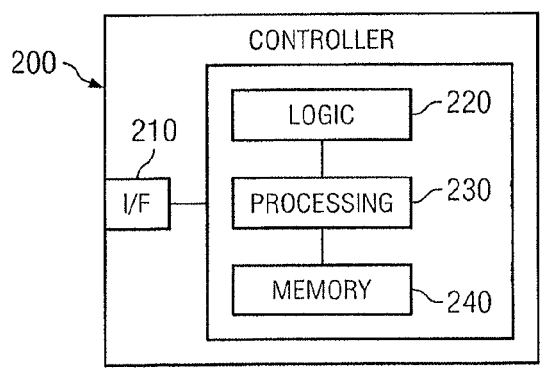
FIG. 2 illustrates an example controller that may be used to control one or more components of the example milking box depicted in FIGS. 1A-1B, according to certain embodiments of the present disclosure.

Walls 124b and/or 124d may comprise one or more gates 126. In certain embodiments, wall 124b and/or wall 124d may comprise an entry gate 126a and an exit gate 126b. A dairy cow may enter milking box 120 through an opened entry gate 126a and exit milking box 120 through an opened exit gate 126b. Closing gates 126 may maintain the dairy cow within milking box 120 during milking, while opening one or more gates 126 may allow the dairy cow to exit milking box 120. In certain embodiments, gates 126 may each be coupled to a corresponding actuator such that the gates 126 may be automatically opened and/or closed. For example, the actuators corresponding to gates 126 may each be configured to communicate (e.g., via wireless or wireline communication) with a controller 200, depicted in detail in FIG. 2.

Controller 200 may include one or more computer systems at one or more locations. Examples of computer systems may include a personal computer, workstation, network computer, kiosk, wireless data port, personal data assistant (PDA), one or more processors within these or other devices, or any other suitable device for receiving, processing, storing, and communicating data. In short, controller 200 may include any suitable combination of software, firmware, and hardware. Controller 200 may include any appropriate interface 210 for receiving inputs and providing outputs, logic 220, one or more processing modules 230, and memory module 240. Logic 220 includes any information, logic, applications, rules, and/or instructions stored and/or executed by controller 200. Processing modules 230 may each include one or more microprocessors, controllers, or any other suitable computing devices or resources and may work, either alone or with other components, to provide a portion or all of the functionality described herein. Controller 200 may additionally include (or be communicatively coupled to via wireless or wireline communication) one or more memory modules 240. Memory modules 240 may be non-transitory and may each include any memory or database module. Memory modules 240 may take the form of volatile or non-volatile memory, including, without limitation, magnetic media, optical media, random access memory (RAM), read-only memory (ROM), removable media, or any other suitable local or remote memory component.

Returning to FIG. 1, controller 200 may be operable to determine, using any appropriate logic in conjunction with signals received from other components of milking box 120 (e.g., presence sensor 132, gate sensors 134, and/or identification sensor 136, each of which is described with regard to FIG. 3, below), which gates 126 should be open and/or closed. Controller 200 may then communicate signals to the actuators coupled to the determined gates 126, the signals causing the gates 126 to open or close. The automated control of gates 126 using controller 200 is described further with regard to FIG. 3, below.

Each milking box 120 may additionally include an equipment portion 128 located to the rear of stall portion 122 (i.e., adjacent to rear wall 124c of stall portion 122). Equipment portion 128 may comprise any structure suitable for housing and/or storing a robotic attacher (e.g., robotic attacher 150, described below with regard to FIG. 3), one or more preparation cups, teat cups, receiver jars, separation containers, and/or any other suitable milking equipment. Rear wall 124c (which may include a backplane 138, as described below with regard to FIG. 3) may separate stall portion 122 from equipment portion 128 such that equipment portion 128 is substantially inaccessible to a dairy cow located in stall portion 122. Accordingly a dairy cow located in stall portion 122 may be prevented from accidentally damaging the milking equipment by kicking, biting, trampling, or exposing the milking equipment to dirt, fluids, etc.

In certain embodiments, the equipment portion 128 being located to the rear of stall portion 122 may allow milking boxes 120 to be aligned in a single row such that walls 124b and 124d of each milking box 120 may comprise an entry gate 126a and an exit gate 126b (as illustrated in FIG. 1A). As a result, milking boxes 120 may be used to sort dairy cows into particular regions 110 by controlling the opening/closing of each gate 126 (e.g., in response to signals from a controller 200, as described above). For example, a dairy cow needing a health check or medical attention my be sorted into an appropriate region 110 (e.g., a veterinary pen). As another example, a dairy cow determined to be finished milking for the year and needing to be dried off and bread may be sorted out of the milking heard. As yet another example, a dairy cow may be sorted into one of a number of regions 110 based on the stage of lactation of the dairy cow (as dairy cows in different stages may require different feeds).

Figure 1B:
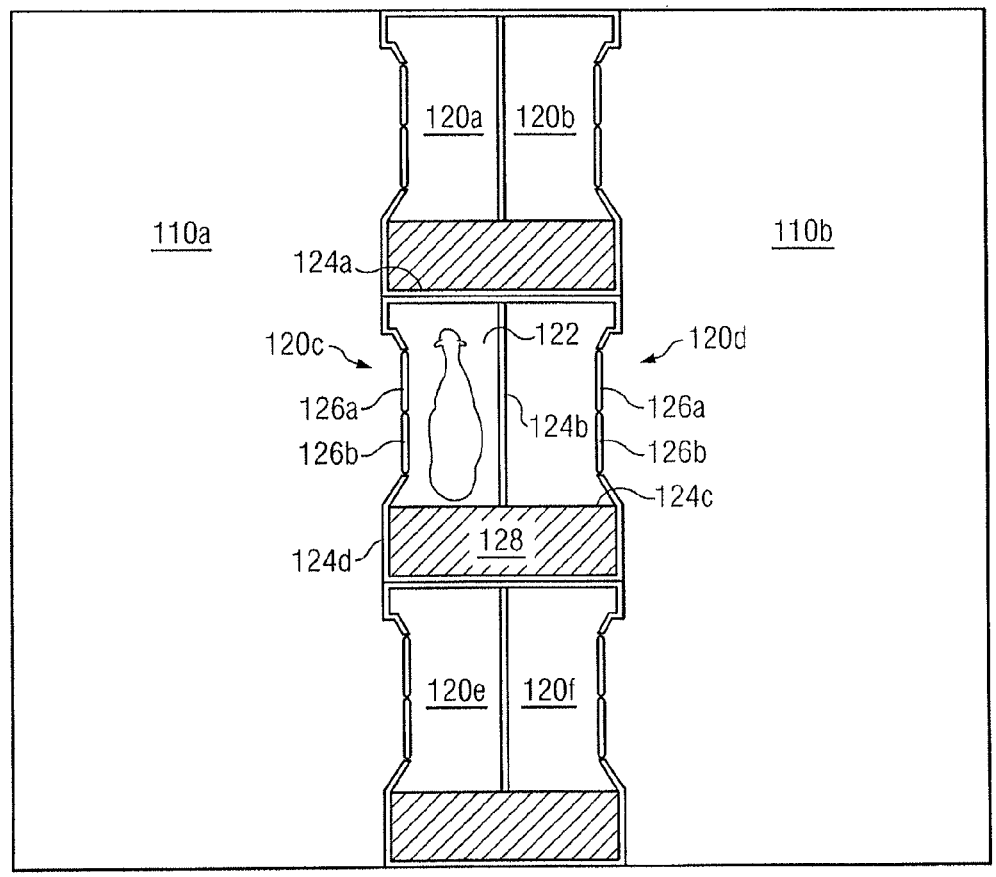

In the preceding discussion, each milking box 120 may include an equipment portion 128. In certain other embodiments, however, a single equipment portion 128 may service multiple milking boxes 120. In certain other embodiments, the equipment portion 128 being located to the rear of stall portion 122 may allow pairs of milking boxes 120 to be located side by side such that the milking boxes share a wall 124 (e.g., wall 124b may be shared between milking box 120c and milking box 120d, as depicted in FIG. 1B). As a result, a single robotic attacher (e.g., robotic attacher 150, described below with regard to FIG. 3) may be shared by the pair of milking boxes 120, which may reduce the cost of installing multiple milking boxes 120 in the enclosure 100.

Figure 3:
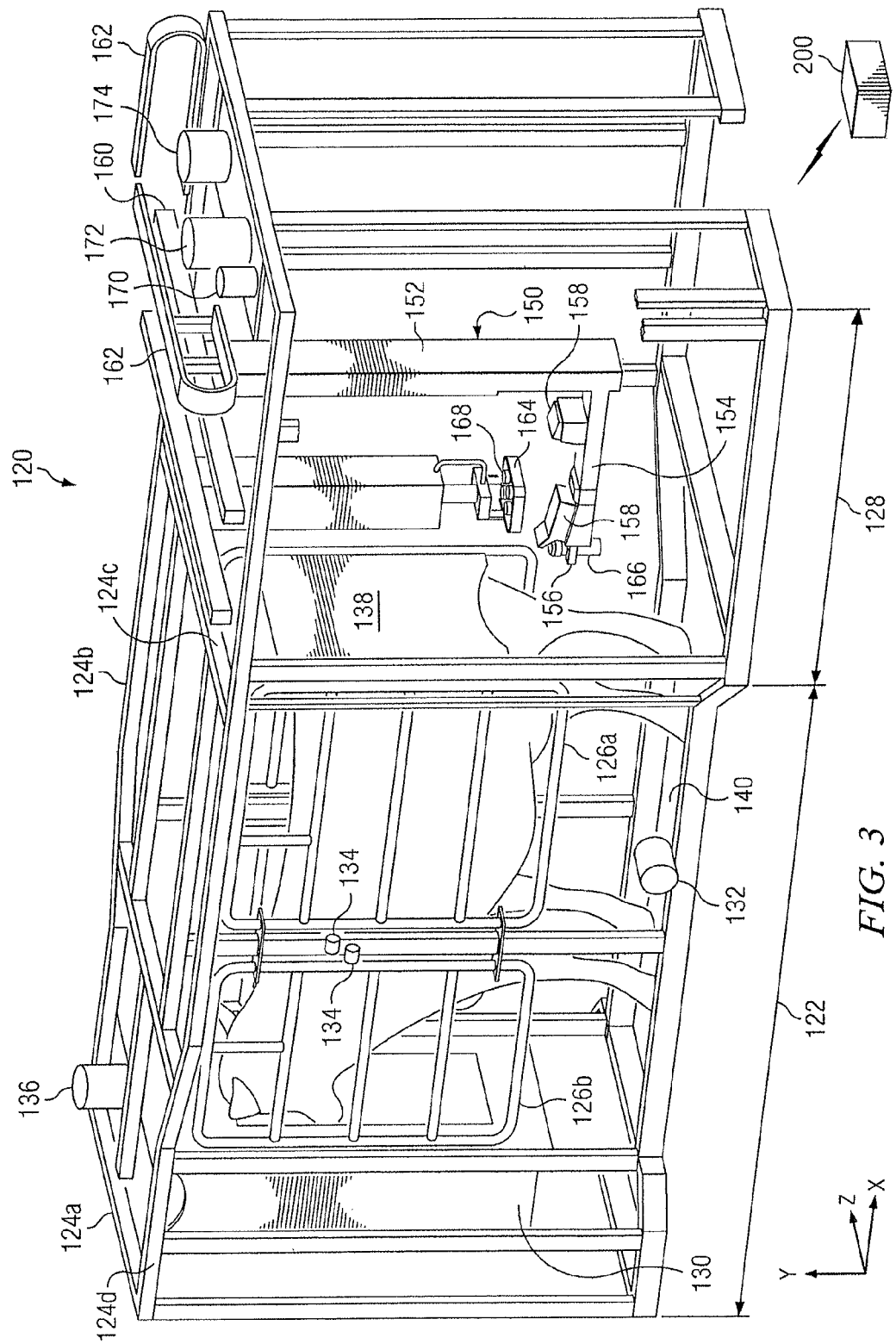
FIG. 3 illustrates a detailed perspective view of the example milking box depicted in FIG. 1, according to certain embodiments of the present disclosure.

FIG. 3 illustrates a detailed perspective view of an example milking box 120, according to certain embodiments of the present disclosure. As described above with regard to FIG. 1, milking box 120 may comprise a stall portion 122 (defined by walls 124 and gates 126) and equipment portion 128 located to the rear of stall portion 122. In certain embodiments, stall portion 122 of milking box 120 may include a feed bowl 130, a presence sensor 132, one or more gate sensors 134, and an identification sensor 136. Additionally, one or more of feed bowl 130, presence sensor 132, gate sensor(s) 134, and identification sensor 136 may be communicatively coupled to controller 200 (described above with regard to FIG. 2).

In certain embodiments, feed bowl 130 may dispense feed in order to attract a dairy cow so that the dairy cow will enter milking box 120 voluntarily. Accordingly, at least one of the entry gates 126a may remain open when there is no dairy cow present to allow a dairy cow to enter. Once the dairy cow has entered milking box 120, presence sensor 132 may detect the presence of the dairy cow. For example, presence sensor 132 may detect when the dairy cow has passed through the entrance gate 126a and/or when the dairy cow is generally centered in the stall portion 122. Upon detecting the presence of the dairy cow, presence sensor 132 may send a signal to controller 200. In response to the signal, controller 200 may cause one or more actuators to close gates 126. Gate sensor 134 may determine when gates 126 have closed. Gate sensor 134 may communicate a signal to controller 200 upon determining that gates 126 have closed. Controller 200 may initiate a milking procedure in response to the signal.

In certain embodiments, identification sensor 136 may determine the identity of the dairy cow. As an example, identification sensor 136 may comprise an antenna operable to read a radio frequency identification (RFID) from an ear tag, a collar, or other identifier associated with the dairy cow. Once the dairy cow has been identified, the identification sensor 136 may optionally be turned off to prevent wasting power and/or to minimize the dairy cow's exposure to radio waves.

Identification sensor 136 may communicate the identity of the dairy cow to controller 200 to facilitate retrieving information describing the dairy cow (e.g., from memory 240 or any other suitable location). Information describing the dairy cow may comprise historical data describing the particular dairy cow during a previous time period, such as a previous milking cycle. The previous milking cycle may refer to a milking cycle in which milking equipment was manually attached (e.g., by a user) or a milking cycle in which milking equipment was automatically attached (e.g., by a robotic attacher 150, described below). In certain embodiments, milking equipment may be attached manually the first time the dairy cow is milked in order to establish initial information describing the dairy cow, such as where the teats are located. The location of the dairy cow's teats may be described relative to a feature of the dairy cow, such as relative to the rear of the dairy cow, the hind legs, and/or a portion of the dairy cow's udder, such as a mid-line of the udder or relative to one or more of the other teats. A robotic attacher (e.g., robotic attacher 150, described below) may use the information describing the location of the teats during subsequent milkings to facilitate automatically attaching the milking equipment.

Examples of historical data include measurements, statistics, health information, and any other information describing the dairy cow during a previous time period. Examples of measurements include the length of the dairy cow (e.g., from head to tail) and the location of the dairy cow's teats during a previous milking cycle. Examples of statistics may include statistics describing when the dairy cow was last milked, the amount of milk produced in previous milking cycles, and so on. Examples of health information may include a designation not to milk the dairy cow due to a health problem or a designation to sort the dairy cow into a veterinary pen. In certain embodiments, a user may set an indicator in the database to indicate that the dairy cow should be sorted into the veterinary pen because the dairy cow is due for a check-up or because the user noticed the dairy cow appears to be ill or injured.

Controller 200 may use the information retrieved according to the identity of the dairy cow to determine how the particular dairy cow should be handled. If the information indicates the dairy cow should not be milked, controller 200 may cause an actuator to open one or more of the exit gates 126b. For example, if controller 200 determines that the dairy cow should be sorted into a particular region 110 of enclosure 100, such as a veterinary pen, it may cause the exit gate 126b that accesses the selected region 110 to open. Alternatively, controller 200 may cause multiple exit gates 126b to open if the dairy cow is to be given the option of which region 110 to occupy upon exiting milking box 120. In certain embodiments, a prod may be used to encourage the dairy cow to exit. Examples of prods include a noise, a mechanical device, or a mild electric shock.

Upon a determination that the dairy cow should be milked, controller 200 may continue the milking procedure. In certain embodiments, controller 200 may cause a dispenser to drop feed into feed bowl 130. Additionally, controller 200 may cause feed bowl 130 to move toward the dairy cow in order to encourage the dairy cow to move to a pre-determined part of stall portion 122. As an example, feed bowl 130 may be initially positioned in the front of stall portion 122 when the dairy cow enters. Feed bowl 130 may then move back toward the dairy cow to encourage the dairy cow to move to the rear of stall portion 122 (e.g., against backplane 138, described below) in order to facilitate attaching the milking equipment to the dairy cow. To ensure feed bowl 130 does not crowd the dairy cow, the amount of movement of feed bowl 130 may be customized to the size of the dairy cow. For example, a user may determine an appropriate location for feed bowl 130 the first time the dairy cow enters milking box 120. The location may be stored (e.g., in memory module 240 of controller 200) such that it may be retrieved during subsequent milkings according to the identity of the dairy cow. Alternatively, the feed bowl 130 may be configured to continue moving toward the rear of the stall portion 122 until the dairy cow contacts backplane 138 (described below), which may indicate that the dairy cow is positioned in a location that is suitable for attaching the milking equipment.

In certain embodiments, rear wall 124c of stall portion 122 includes a backplane 138. Backplane 138 may comprise any suitable configuration of materials suitable for locating the rear of the dairy cow in order to facilitate the efficient attachment of the milking equipment. In certain embodiments, the dairy cow may be backed toward backplane 138 by moving feed bowl 130 as described above. In certain other embodiments, backplane 138 may be moved forward toward the dairy cow. In certain other embodiments, a combination of backing the dairy cow toward backplane 138 and moving backplane 138 forward toward the dairy cow may be used. It may be determined that the rear of the dairy cow has been located when a portion of backplane 138, such as a pipe or bracket, touches the rear of the dairy cow at any suitable location, such as approximately mid-flank (i.e., between the udder and the tail). Backplane 138 may additionally include a manure gutter for directing manure toward a side of stall portion 122 (e.g., away from the dairy cow's udder and the milking equipment).

In certain embodiments, stall portion 122 may additionally include a waste grate 140 for disposing of waste. Waste grate 140 may have a rough surface to discourage the dairy cow from standing on it. In addition, waste grate 140 may be dimensioned such that when the dairy cow's hind legs are positioned on opposite sides of waste grate 140, the hind legs are separated to facilitate attachment of the milking equipment to the dairy cow's teats.

In certain embodiments, equipment portion 128 of milking box 120 may include a robotic attacher 150, one or more preparation cups 166, teat cups 168, pumps 170, receiver jars 172, milk separation containers 174, and/or any other suitable milking equipment. In certain embodiments, robotic attacher 150 may be suspended into equipment portion 128 from a rail 160. Rail 160 may be generally located above the level of the udder of a dairy cow located in stall portion 122 such that the teats of the dairy cow may be accessible to robotic attacher 150 when suspended from rail 160. For example, rail 160 may extend across the top of equipment portion 128 of milking box 120 and may be oriented substantially parallel to rear wall 124c.

Robotic attacher 150 may be communicatively coupled to controller 200 (e.g., via a network facilitating wireless or wireline communication). Controller 200 may cause robotic attacher to attach certain milking equipment to the dairy cow's teats. For example, in certain embodiments, robotic attacher 150 may access a storage area 164 to retrieve preparation cups 166 and/or teat cups 168. Preparation cups 166 may be adapted to clean the teats, stimulate the flow of milk, and discard fore milk from the teat (e.g., the first few millimeters of milk that may be dirty). Teat cups 168 may be adapted to extract milk from the dairy cow. Preparation cups 166 and/or teat cups 168 attached to extendable hoses may by hung within storage area 164 between milkings to protect the cups from manure and flies. When it is time to milk the dairy cow, robotic attacher 150 may pull preparation cups 166 from storage area 164 and attach them to the dairy cow one at a time, two at a time, or four at a time. After the teats have been prepared, preparation cups 166 may be removed and teat cups 168 may be attached one at a time, two at a time, or four at a time. Once the cups are attached, robotic attacher 150 may withdraw to prevent the dairy cow from causing accidental damage to the equipment, and the system may proceed with milking the dairy cow.

During milking, pump 170 may pump good milk from teat cup 168 to receiver jar 172 to be stored at a cool temperature. Pump 170 may pump bad milk to milk separation container 174 to be discarded. Milk may be determined to be bad based on testing the milk and/or based on the particular dairy cow from which the milk has been extracted. For example, information retrieved from a database according to the dairy cow's identifier may indicate that the milk should be discarded because the dairy cow is ill or has recently calved.

In certain embodiments, robotic attacher 150 comprises a main arm 152, a supplemental arm 154, a gripping portion 156, and a vision system 158. In certain embodiments, the movement of main arm 152, supplemental arm 154, and gripping portion 156 may be varied in response to signals received from controller 200 (as described in further detail in FIG. 4 below). Although the components of robotic attacher 150 are depicted and primarily described as oriented in a particular manner, the present disclosure contemplates the components having any suitable orientation, according to particular needs.

In order to obtain access to the dairy cow's teats, main arm 152, supplemental arm 154, and gripping portion 156 may work together to facilitate movement in three dimensions, for example, according to an x-axis, a y-axis, and a z-axis. As illustrated, the x-axis extends in the direction of the dairy cow's length (e.g., from head-to-tail), the y-axis extends in the direction of the dairy cow's height, and the z-axis extends in the direction of the dairy cow's width.

Main arm 152 may comprise a vertical arm movably coupled to rail 160. For example, a hydraulic cylinder may movably couple main arm 152 to rail 160. Main arm 152 may traverse rail 160 to facilitate movement of robotic attacher 150 along the z-axis. Accordingly, rail 160 may comprise a track and rollers adapted to support the weight of robotic attacher 150 and to facilitate movement of main arm 152 back-and-forth along rail 160. To prevent wires and hoses from interfering with the movement of main arm 152 along rail 160, guides 162 may be used to loosely hold the wires and hoses in place. For example, guides 162 may comprise U-shaped brackets that allow the wires and hoses to extend a sufficient amount to accommodate movements of main arm 152, but prevent the wires and hoses from dangling in the path of main arm 152.

Main arm 152 attaches to supplemental arm 154. Supplemental arm 154 facilitates movements in any direction. That is, supplemental arm 154 moves in-and-out along the x-axis, up-and-down along the y-axis, and/or from side-to-side along the z-axis. Accordingly, supplemental arm may extend between the rear legs of the dairy cow located within stall portion 122 in order to attach milking equipment to the dairy cow. Supplemental arm 154 may comprise gripping portion 156. Gripping portion 156 may grip a preparation cup 166 or a teat cup 168 for attachment to the dairy cow's teat. Gripping portion 156 may comprise a wrist adapted to perform fine movements, such as pivot and tilt movements, to navigate around the dairy cow's legs and to access the dairy cow's teats. To determine the location of the dairy cow's legs and teats, robotic attacher 150 may use vision system 158. An example embodiment of vision system 158 is described with respect to FIG. 4 below.

Figure 4:
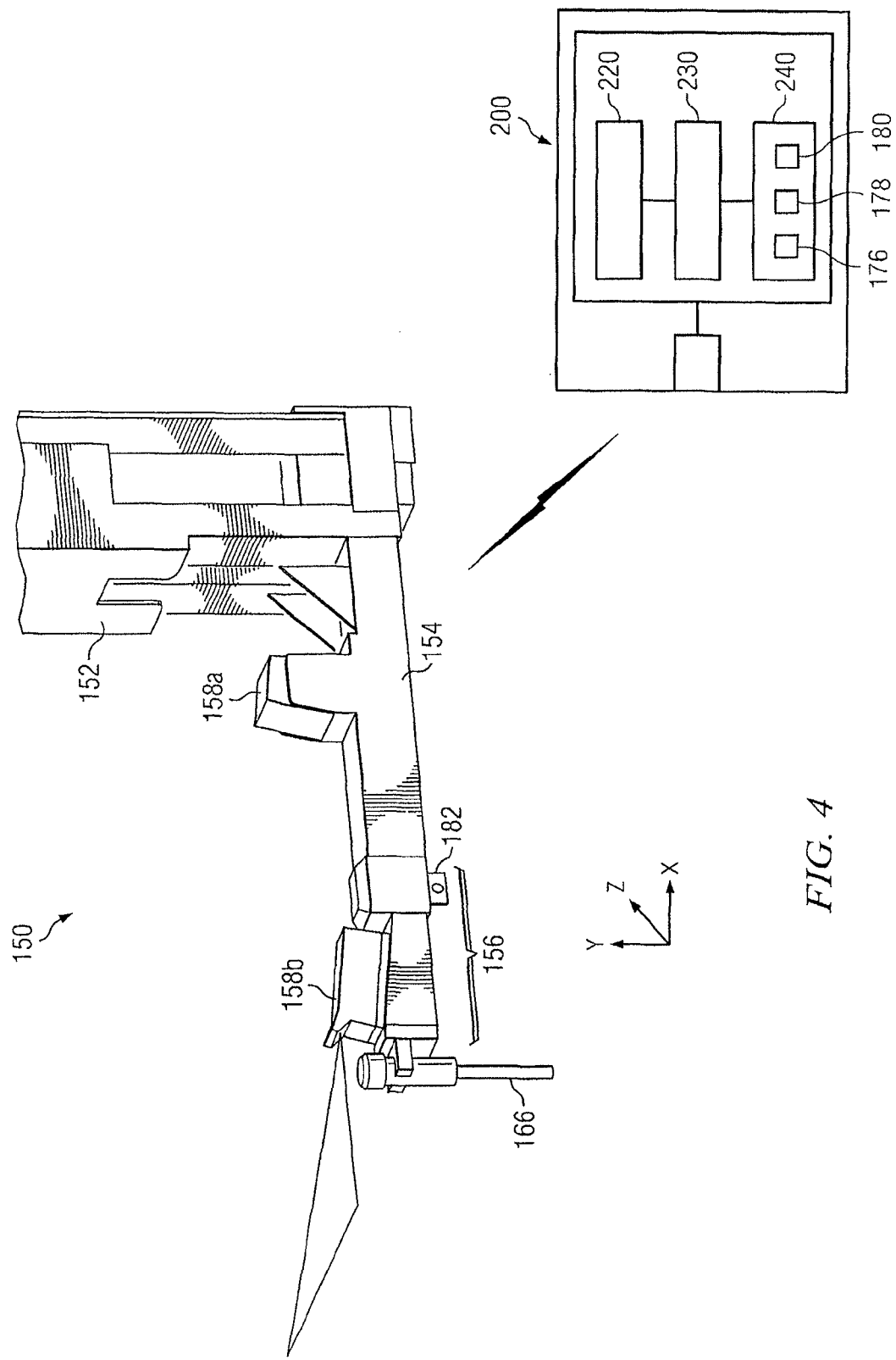
FIG. 4 illustrates a detailed perspective view of the example robotic attacher depicted in FIG. 3, according to certain embodiments of the present disclosure.

FIG. 4 illustrates a detailed perspective view of an example of robotic attacher 150, according to certain embodiments of the present disclosure. Robotic attacher 150 may include a main arm 152, a supplemental arm 154, a gripping portion 156, and a vision system 158. As described with respect to FIG. 3, robotic attacher 150 may be communicatively coupled to controller 200. Controller 200 may cause robotic attacher to retrieve a cup, such as preparation cup 166 or teat cup 168, move the cup toward a teat of a dairy cow within milking box 120, and attach the cup to the teat.

In general, the teats of the dairy cow may be relatively less visible when looking at the dairy cow from the rear and relatively more visible when looking at the dairy cow from the side. Vision system 158 may facilitate locating the teats from a position to the rear of the dairy cow. Vision system 158 may include multiple cameras, such as a first camera 158a and a second camera 158b. In certain embodiments, cameras 158a, 158b may be coupled to robotic attacher 150 and may be positioned at any suitable location along main arm 152 or supplemental arm 154. As an example, second camera 158b may be coupled to gripping portion 156 of supplemental arm 154 at a location proximate to the part of gripping portion 156 adapted to hold a teat cup, and first camera 158a may be coupled to supplemental arm 154 at a location between second camera 158b and main arm 152.

In operation, controller 200 may access a first image 176 generated by first camera 158a (e.g., from memory module 240) and use first image 176 to determine, using any suitable logic 220, a reference point 178 proximate to the udder, which may then be stored (e.g., in memory module 240). The reference point 178 may be defined relative to certain features of the dairy cow, such as the hind legs and/or the udder. Controller 200 may send a signal to robotic attacher 150 causing robotic attacher 150 to position second camera 158b relative to the reference point 178. Accordingly, second camera 158b may have a consistent point of reference from one milking cycle to the next, which may allow the teats to be located efficiently. Controller 200 may access a second image 180 generated by second camera 158b (e.g., from memory module 240) in order to determine, using any suitable logic 220, a location of a teat.

In certain embodiments, first camera 158a may comprise a three-dimensional camera adapted to generate a first image 176 depicting the rear of the dairy cow, including the hind legs and the udder. Using a three-dimensional camera may facilitate generating a relatively complete image of the rear of the dairy cow within approximately a couple of seconds (e.g., one second), which may be faster than the amount of time it would take for a two-dimensional camera to generate a similar image. In certain embodiments, second camera 158b may comprise a two-dimensional camera adapted to generate a second image 180 depicting at least a portion of the udder to facilitate locating the teats. Second camera 158b may facilitate locating the end of each teat with a relatively high degree of accuracy, such as within a few millimeters. The location of the teat may be used to instruct robotic attacher 150 where to attach the milking equipment.

First camera 158a may begin generating the first image 176 in response to a signal from controller 200 indicating that the dairy cow is positioned proximate to the milking equipment. As an example, the signal may indicate that the rear of the dairy cow has been detected by the backplane 138 of the milking box 120. First camera 158a may begin generating the first image 176 from a starting point and may update the first image 176 in real-time as robotic attacher 150 approaches the dairy cow. The starting point may be determined according to a default position of robotic attacher 150 (e.g., a position determined relative to milking stall 122). Thus, the starting point may be determined without the use of historical data associated with the particular dairy cow being milked. First camera 158a may communicate the first image 176 to controller 200, and controller 200 may use the image to locate main features of the dairy cow, such as the right hind leg, the left hind leg, the udder, and/or the tail.

Controller 200 may determine the reference point 178 based on the location of the main features of the dairy cow. The reference point 178 may be defined relative to certain features of the dairy cow, such as the hind legs and/or the udder. As an example, the reference point 178 may be defined between the hind legs and/or below the udder. For example, in certain embodiments, the reference point 178 may be located proximate to a mid-point of the udder. The mid-point of the udder may refer to a point generally located between the front teats and the rear teats in the x-direction and/or between the left teats and the right teats in the z-direction. In certain embodiments, the mid-point of the udder may be estimated prior to determining the precise location of the teats, for example, according to the general size and location of the udder. The reference point 178 may be spaced apart from the dairy cow in the y-direction to minimize the likelihood that second camera 158b touches the dairy cow. For example, the reference point 178 may be located a few inches below the mid-point of the udder.

Controller 200 may communicate the reference point 178 and/or information describing the main features of the dairy cow to robotic attacher 150. The reference point 178 may be used to position second camera 158b. The information describing the main features of the dairy cow may be used to prevent robotic attacher 150 from colliding with the dairy cow when navigating second camera 158b toward the reference point 178. Information describing the main features of the dairy cow may include the position of the hind legs, the space between the hind legs, the position of the udder, the height of the udder, the position of the tail, and/or other information. Once robotic attacher 150 has positioned second camera 158b relative to the reference point 178, second camera 158b may begin scanning the udder.

In certain embodiments, second camera 158b may determine where to look for one or more of the teats according to historical data. The historical data may be received from controller 200 and may describe a previously-determined location of the teats relative to the reference point 178. The previously-determined location may be based on the location of the teats during one or more previous milking cycles. As an example, the previously-determined location may comprise the location of the teats during the most recent milking cycle. As another example, the previously-determined location may comprise an average of the locations of the teats during a number of previous milking cycles. As another example, the previously-determined location may comprise the location of the teats during a previous milking cycle in which the udder was likely to be as full of milk as the current milking cycle. For example, if eight hours have elapsed since the dairy cow was last milked, the previously-determined location may be determined from a previous milking cycle in which the dairy cow had not been milked for approximately eight hours. Referring to historical data may minimize the area that second camera 158b must scan in order to locate the teat and may reduce the amount of time required to locate the teat.

Second camera 158b may communicate the second image 180 to controller 200, and controller 200 may access the second image 180 to locate the teats of the dairy cow. As described above, in certain embodiments, second camera 158b may comprise a two-dimensional camera, such as a horizontal laser. If the horizontal laser may scan a portion of the udder other than the teats (e.g., a relatively even surface of the udder), the scan communicated to controller 200 may generally resemble a substantially solid line. If the horizontal laser scans a portion of the udder that includes the teats, the scan communicated to controller 200 may generally resemble a broken line depicting the teats and the spaces between the teats. As an example, controller 200 may determine that a teat has been located if the scan comprises a broken line in which a solid portion of the line generally corresponds to the width of a teat and the broken portions of the line generally correspond to the proportions of the space between teats.

In certain embodiments, robotic attacher 150 may further comprise a nozzle 182. Nozzle 182 may be coupled to gripping portion 156. Nozzle 182 may spray disinfectant on the teats of the dairy cow at the end of a milking cycle, that is, after the dairy cow has been milked and the teat cups have been removed. The disinfectant may be sprayed to prevent mastitis or other inflammation or infection. In certain embodiments, gripping portion may be operable to rotate 180° around the x-axis. During milking, second camera 158b may be generally oriented on top of gripping portion 156, and nozzle 182 may be generally oriented underneath gripping portion 156 (i.e., opposite second camera 158b). Orienting nozzle 182 underneath gripping portion 156 during milking may prevent milk or other contaminants from accessing nozzle 182. Once the milking has been completed, gripping portion 156 may rotate such that nozzle 182 may be generally oriented on top of gripping portion 156, and second camera 158b may be generally oriented underneath gripping portion 156. Orienting nozzle 182 on top of gripping portion 156 after milking may facilitate spraying the teats with disinfectant from nozzle 182.

Figure 5:
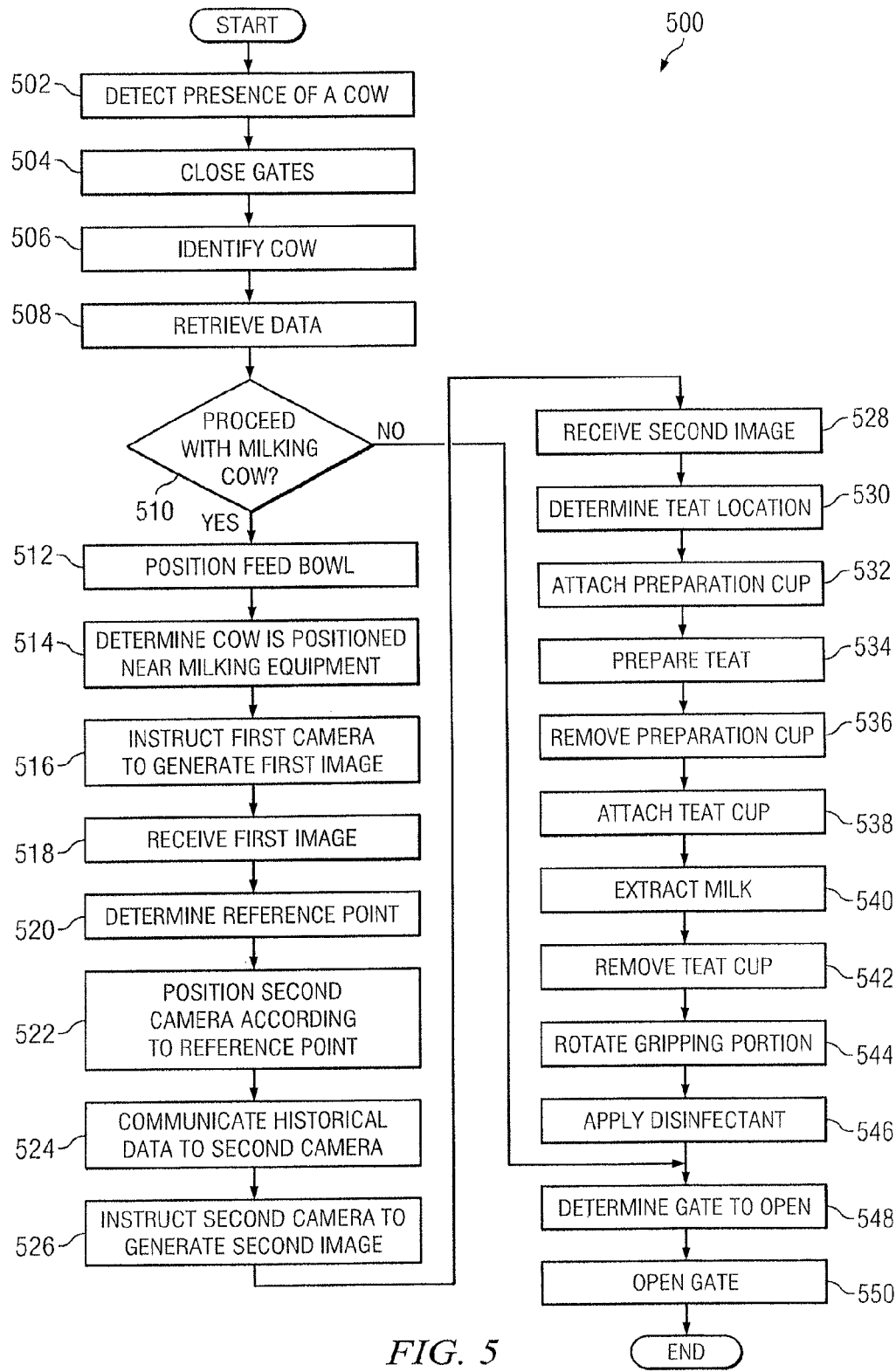
FIG. 5 illustrates an example method for milking a dairy cow using the example milking box depicted in FIGS. 1-4, according to certain embodiments of the present disclosure.

FIG. 5 illustrates an example method 500 for milking a dairy cow using the example milking box 120 depicted in FIGS. 1-4, according to certain embodiments of the present disclosure. In certain embodiments, milking box 120 may be positioned within enclosure 100, and at least one of the gates 126 of stall portion 122 may be opened to allow the dairy cow to voluntarily enter milking box 120. At step 502, presence sensor 132 detects the presence of the dairy cow. Presence sensor 132 communicates a signal to controller 200 indicating the presence of the dairy cow has been detected. Controller 200 sends a signal to an actuator causing gates 126 to close at step 504. Thus, the dairy cow is prevented from exiting the milking box. Gate closed sensor 134 determines that the gates are closed and communicates a gate-closed signal to controller 200. In response to the gate-closed signal, controller 200 causes the milking procedure to proceed to the next step. For example, controller 200 sends a signal requesting identification sensor 136 to provide an identifier associated with the dairy cow.

At step 506, identification sensor 136 reads an ear tag, collar, or other identifier (e.g., an RFID signal) associated with the dairy cow. Identification sensor 136 communicates the identifier to controller 200 to facilitate determining the identity of the cow. At step 508, controller 200 retrieves information associated with the particular dairy cow according to the determined identity of the dairy cow. For example, information may be retrieved from memory 240. Controller 200 determines whether to proceed with milking the dairy cow at step 510. The determination may be made according to the information associated with the dairy cow. For example, if the information indicates that the dairy cow is ill or that the dairy cow has already been milked in the current milking cycle, a determination may be made not to proceed with milking the dairy cow. Alternatively, if the information indicates that the dairy cow is healthy and that it is time to milk the dairy cow, a determination may be made to proceed with milking the dairy cow. If the dairy cow is to be milked, the method continues to step 512. If the dairy cow is not to be milked, the method skips to step 548.

At step 512, controller 200 causes a dispenser to drop feed into feed bowl 130 and positions feed bowl 130. In certain embodiments, feed bowl 130 may move toward the rear of the stall to encourage the dairy cow to back-up toward the milking equipment. Controller 200 determines that the dairy cow is positioned near the milking equipment at step 514. For example, a signal received from backplane 138 of milking box 120 may be used to determine that the dairy cow is positioned near the milking equipment. The signal may indicate when the rear of the dairy cow touches a portion of backplane 138. Upon determining the dairy cow is positioned near the milking equipment (e.g., toward the rear of the stall portion of the milking box), controller 200 instructs first camera 158a to generate a first image 176 of the rear of the dairy cow at step 516. In certain embodiments, first camera 158a may be positioned on robotic attacher 150, and first camera 158a may begin generating the first image 176 in-flight, that is, as robotic attacher 150 retrieves a preparation cup 166 or teat cup 168 from storage and begins moving the cup toward the udder. At step 518, controller 200 receives the first image 176. The first image 176 includes main features of the dairy cow, such as the hind legs, the udder, and/or the tail. Controller 200 accesses the first image 176 to determine a reference point 178 at step 520. As an example, the reference point 178 may comprise a point between the dairy cow's hind legs, a point below the dairy cow's udder, and/or a point proximate to a mid-point of the udder. The mid-point may refer to a point between a first teat and a second teat (e.g., between a left teat and a right teat and/or between a front teat and a rear teat).

At step 522, controller 200 sends a signal causing robotic attacher 150 to position second camera 158b relative the reference point 178. Controller 200 communicates historical data to second camera 158b at step 524. The historical data may comprise data retrieved from a database that indicates a previously-determined location of the teats during a previous milking cycle. The previously-determined location may be described relative to the reference point 178. The method proceeds to step 526 where controller 200 sends a signal causing second camera 158b to generate a second image 180. Second camera 158b may generate the second image 180 by scanning a portion of the udder indicated by the historical data. Second camera 158b may scan the whole teat to facilitate identifying the angle of the teat and the point attachment. At step 528, the controller 200 receives the second image 180 from the second camera. Controller 200 accesses the second image 180 to determine the location of the teats at step 530. The teats may be located in any suitable manner, such as one at a time, two at a time, or four at a time.

Upon determining the location of the teats, controller 200 causes robotic attacher 150 to attach one or more preparation cups 166 at step 532. Second camera 158b may continue to scan the teat while the preparation cup is being attached. Continuing to scan the teat may allow for efficient attachment of the preparation cup. In addition, continuing to scan the teat may allow the preparation cup to be attached at a suitable angle, with the mouthpiece centered on the teat, to prevent folding the teat into the preparation cup. Vacuum pressure may be used to hold the preparation cups in place. Preparation cup 166 facilitates preparing the teat at step 534. Preparation may include cleaning the teat, stimulating the flow of milk, and discarding fore milk from the teat. After each of the teats have been prepared, preparation cups 166 may be removed at step 536. For example, the vacuum pressure may be released to remove the preparation cups and the preparation cups may be returned to the storage area.

The method continues to step 538, where controller 200 causes robotic attacher 150 to attach a teat cup 168. For example, teat cup 168 may be retrieved from storage area 164 and navigated to the teat. Second camera 158b may continue to scan the teat while the teat cup 168 is being attached to ensure proper placement of the teat cups. Vacuum pressure may be used to attach the teat cup 168. A sensor may be used to determine the vacuum pressure associated with each teat cup 168. If the vacuum level is low, it may indicate that teat cup 168 has fallen off and needs to be reattached. In certain embodiments, additional teat cups 168 may be attached by re-performing steps 522-530 to locate additional teats.

Once teat cups 168 have been attached to all four teats, robotic attacher 150 may retract and the method may proceed to step 540 to extract milk from the dairy cow. As an example, milk may be extracted by applying pulsation to the teat cup. A sensor may monitor the flow of milk. If the flow becomes low, it may be determined whether teat cup 168 should be removed or reattached. For example, if teat cup 168 has been attached for at least approximately one-and-a-half minutes and/or the amount of milk extracted is consistent with previous milking cycles, it may be determined that teat cup 168 should be removed, otherwise, it may be determined that teat cup 168 should be reattached. When it is determined that teat cup 168 should be removed, controller 200 initiates step 542 to remove teat cups 168. For example, controller 200 may send a signal causing the vacuum pressure to be released to allow teat cups 168 to drop from the teats. Teat cups 168 may be returned to storage area 164 by retracting hoses attached to teat cups 168 or by any other suitable method. Controller 200 then sends a signal to robotic attacher 150 to cause gripping portion 156 to rotate at step 544 in order to orient nozzle 182 toward the teat. The method applies disinfectant to the teat at step 546 by spraying the disinfectant through nozzle 182.

At step 548, controller 200 determines which gate(s) 126 to open. Selectively opening gates 126 may allow the dairy cow to be sorted into a particular region 110 of enclosure 100. The dairy cow may be sorted if its milk tested bad, if it failed to produce a sufficient amount of milk, if information retrieved from a database indicates the dairy cow should be sorted, or for other suitable reasons. Controller 200 sends a signal causing an actuator to open the selected gate(s) at step 550. In certain embodiments, a prod may be used to encourage the dairy cow to exit the milking box. The dairy cow exits the milking box and the method ends.

Figure 6:
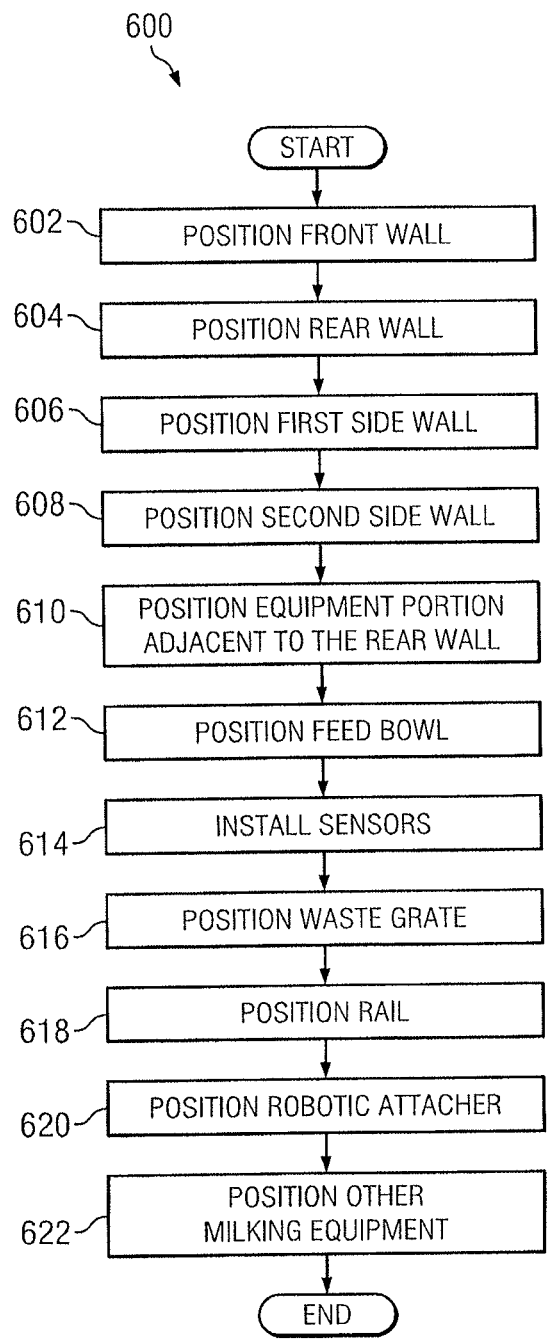
FIG. 6 illustrates an example method for installation of the example milking box depicted in FIGS. 1-4, according to certain embodiments of the present disclosure.

FIG. 6 illustrates an example method 600 for installation of milking box 120, according to certain embodiments of the present disclosure. The method may begin by positioning walls 124 in order to define stall portion 122. For example, the method positions a front wall 124a at step 602. The method proceeds to step 604 where a rear wall 124c is positioned substantially parallel to front wall 124a. Rear wall 124c may be spaced apart from front wall 124a a suitable distance to accommodate a dairy cow. At step 606, a first side wall 124b is positioned to extend between front wall 124a and rear wall 124c. The first side wall may include one or more gates, such as an entry gate 126a and an exit gate 126b. The method proceeds to step 608 to position a second side wall 124d to extend between front wall 124a and rear wall 124c. Second side wall 124d may be spaced apart from first side wall 124d in order to accommodate a dairy livestock within stall portion 122. Second side wall 124d may or may not include gates 126. For example, in certain embodiments, second side wall 124d may comprise a second entry gate 126a and a second exit gate 126b. In alternative embodiments, second side wall 124d may be positioned adjacent a second milking box and may define a boundary between milking box 120 and the adjacent milking box. In step 610, an equipment portion 128 is positioned to the rear of milking box 120, adjacent rear wall 124c. Rear wall 124c may comprise a backplane 138 adapted to physically contact a mid-flank portion of the dairy livestock when the dairy livestock is positioned proximate to equipment portion 128 of milking box 120.

At step 612, a movable feed bowl 130 may be positioned within milking box 120. Movable feed bowl 130 may be adapted to move from the front of milking box 120 toward the rear of milking box 120 to encourage the dairy livestock to back-up toward backplane 138. The method may proceed to step 614 to install a plurality of sensors within milking box 120. Examples of sensors include a presence sensor 132 adapted to detect the presence of the dairy livestock within milking box 120, one or more gate closed sensors 134 to detect whether gates 126 are closed, and a livestock identification sensor 136 adapted to determine the identity of the dairy livestock present within milking box 120. At step 616, a waste grate 140 may be positioned within milking box 120.

The method may proceed to step 618 to position a rail 160. Rail 160 may be positioned to extend in a horizontal direction substantially parallel to rear wall 124c. For example, the horizontal direction may refer to the z-axis illustrated in FIG. 3. In certain embodiments, rail 160 may be positioned proximate to rear wall 124c. At step 620, a robotic attacher 150 may be positioned in milking box 120. Robotic attacher may comprise a main arm 152, a supplemental arm 154, including a gripping portion 156, and a vision system 158. In certain embodiments, robotic attacher 150 may be positioned in equipment portion 128 of milking box 120 by suspending main arm 152 from rail 160. Accordingly, main arm 152 may be operable to traverse rail 160 in the horizontal direction. In certain embodiments, one or more guides 162 may be positioned proximate to rail 160. Guides 162 may be adapted to guide the path of hoses and wires connected to robotic attacher 150 to prevent the hoses and wires from interfering with the movement of main arm 152 along rail 160. Supplemental arm 154 may be positioned to facilitate selectively extending supplemental arm 154 between the rear legs of the dairy livestock located within stall portion 122.

The method proceeds to step 622 to position other milking equipment in equipment portion 128 of milking box 120. Other milking equipment may include one or more preparation cups 164, teat cups 168, pumps 170, milk receiver jars 172, and/or milk separation containers 174. The method then ends.

FIGS. 7A-D illustrate example configurations of an enclosure 100 in which one or more milking boxes 120 are arranged, according to certain embodiments of the present disclosure. An equipment portion 128 and the multiple milking boxes 120 serviced by the equipment portion 128 may define a milking box stall cluster 121. Each milking box 120 in the milking box stall cluster 121 may be located adjacent to equipment portion 128. As a result, a single robotic attacher 150 (described above in connection with FIG. 3) may be shared by all the milking boxes 120 in milking box stall cluster 121, which may reduce the cost of installing multiple milking boxes 120 in the enclosure 100.

Figure 7A:
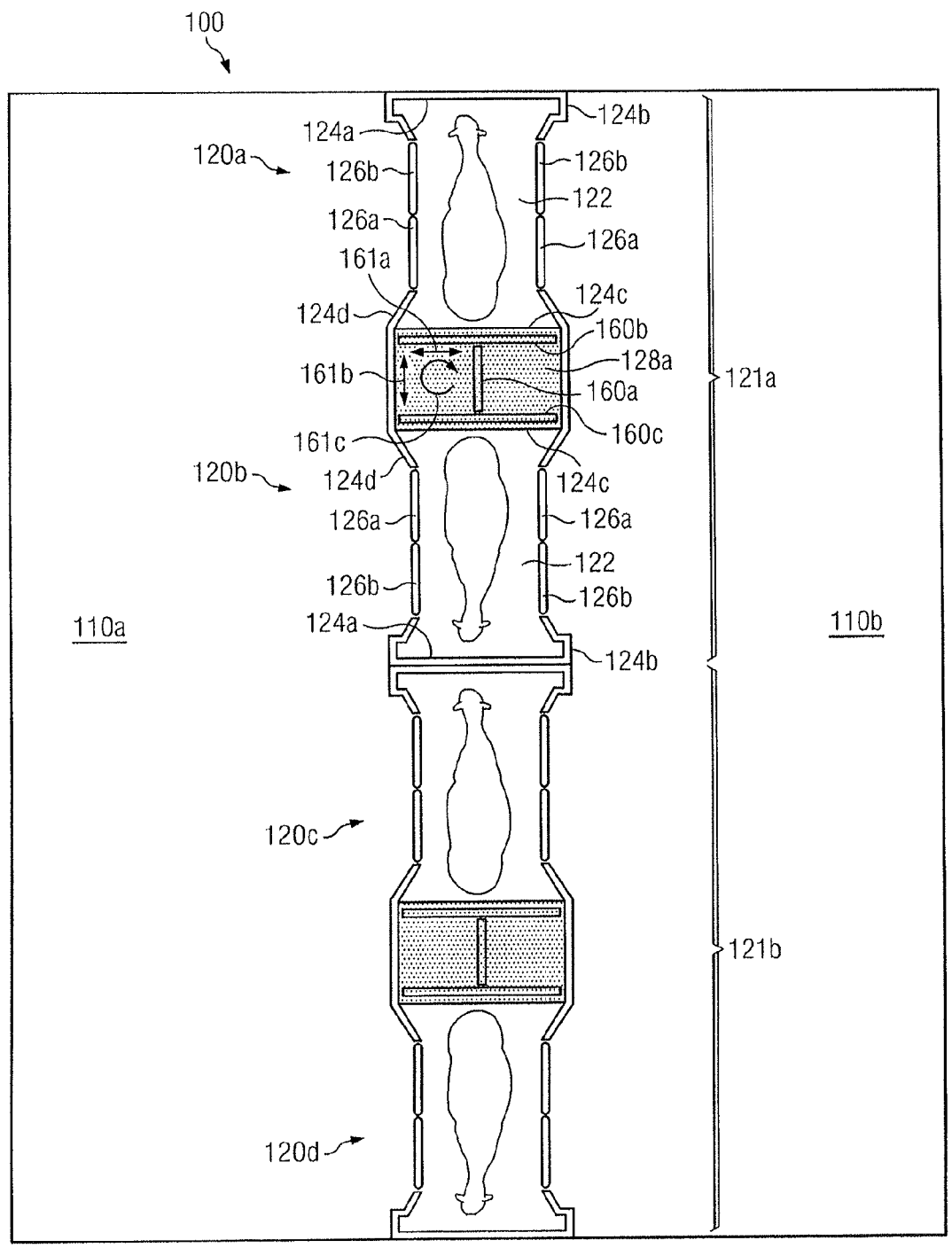
FIGS. 7A-7D illustrate example configurations of an enclosure in which one or more milking boxes are installed, according to certain embodiments of the present disclosure.

In certain embodiments, a milking box stall cluster 121 may include two milking boxes 120, as illustrated in FIG. 7A (e.g. milking boxes 120a-b in cluster 121a and milking boxes 120c-d in cluster 121b). The two milking boxes 120 may be arranged on opposite sides of equipment portion 128, such that the rear of each stall portion 122 (i.e. the rear wall 124c) is adjacent to the side of equipment portion 128. Therefore, when a cow is present in either of the two milking boxes 120, the cow's rear legs will be situated near equipment portion 128, allowing robotic attacher 150 to extend between the rear legs of the cow.

As described in connection with FIG. 3, in certain embodiments robotic attacher 150 may be suspended into equipment portion 128 from a rail 160. In further embodiments, equipment portion 128 may have a network of rails 160, allowing a robot attacher 150 suspended from a rail 160 to move throughout the network of rails 160 and service all milking boxes 120 in a milking box stall cluster 121. For example, as illustrated in FIG. 7A, equipment portion 128 may include rails 160a-c, which may extend across the top of equipment portion 128, as discussed in connection with FIG. 3. Rail 160b may be adjacent to and oriented substantially parallel to rear wall 124c of milking box 120a. Rail 160c may be adjacent to and oriented substantially parallel to rear wall 124c of milking box 120b. Rail 160a may be oriented substantially perpendicular to rail 160b and rail 160c and may connect rail 160b and rail 160c near their respective midpoints. Robotic attacher 150, suspended from rails 160a-c, may be configured to traverse rails 160b-c in the directions indicated by arrow 161a in order to move laterally in servicing each milking box 120. Robotic attacher 150 may also be configured to traverse rail 160a in the directions indicated by arrow 161b in order to move forward and backward between milking box 120a and milking box 120b. Robotic attacher 150 may also be configured to rotate on rails 160a-c in the counter-clockwise direction indicated by arrow 161c and/or in the clockwise direction in order to pivot between milking box 120a and milking box 120b.

Figure 7B:
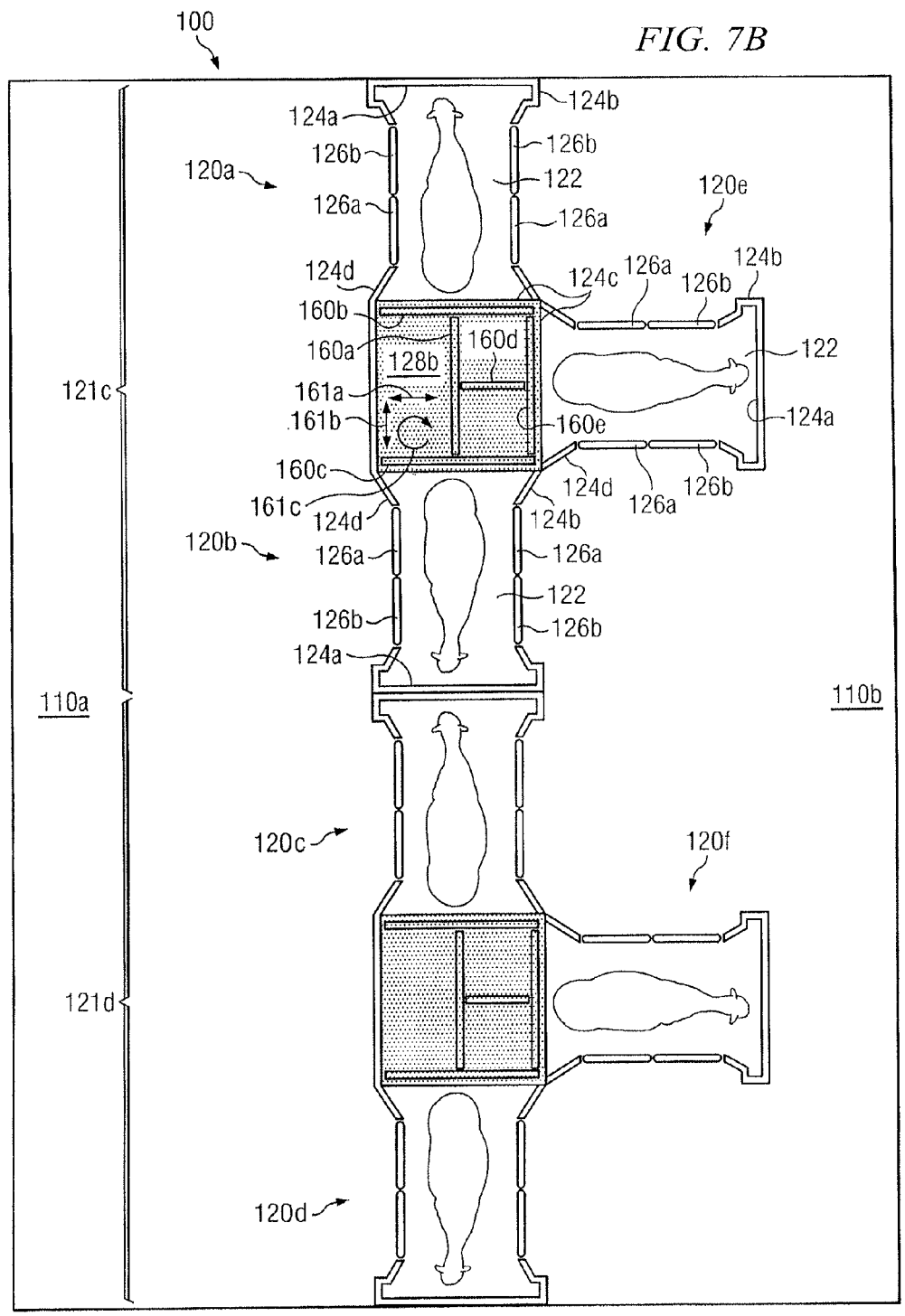

In certain other embodiments, a third milking box 120 may be added to milking box stall cluster 121, as illustrated in FIG. 7B (e.g. milking box 120e in cluster 121c and milking box 120f in cluster 121d), allowing equipment portion 128 to service all three milking boxes 120. The third milking box 120 may be arranged on a third side of equipment portion 128, such that the rear of stall portion 122 (i.e. the rear wall 124c) is adjacent to the side of equipment portion 128, allowing robotic attacher 150 to extend between the rear legs of a cow in the third milking box.

Equipment portion 128 may have a network of rails 160, allowing a robotic attacher 150 suspended from a rail 160 to move throughout the network of rails 160 and service all three milking boxes 120 in a milking box stall cluster 121. For example, as illustrated in FIG. 7B, equipment portion 128 may include rails 160a-e which may extend across the top of equipment portion 128, as discussed in connection with FIG. 3. Rail 160b may be adjacent to and oriented substantially parallel to rear wall 124c of milking box 120a. Rail 160c may be adjacent to and oriented substantially parallel to rear wall 124c of milking box 120b. Rail 160a may be oriented substantially perpendicular to rail 160b and rail 160c, and may connect rail 160b and rail 160c near their respective midpoints. Rail 160e may be adjacent to and oriented substantially parallel to rear wall 124c of milking box 120e, and may connect rail 160b and rail 160c near their respective endpoints. Rail 160d may be oriented substantially perpendicular to rail 160a and rail 160e, and may connect rail 160a and rail 160e near their respective midpoints. Although rails 160a-e are depicted and primarily described as being generally formed in straight lines, this disclosure contemplates rails 160a-e with curves, or with any other suitable geometry.

Robotic attacher 150, suspended from rails 160a-e, may be configured to traverse rails 160b-c in the directions indicated by arrow 161a, and to traverse rail 160e in the directions indicated by arrow 161b, in order to move laterally in servicing each milking box 120. Robotic attacher 150 may also be configured to traverse rail 160a in the directions indicated by arrow 161b, and to traverse rail 160d in the directions indicated by arrow 161a, in order to move forward and backward between milking box 120a and milking box 120b or between milking box 120e and rail 160a. Robotic attacher 150 may also be configured to rotate on rails 160a-e in the counter-clockwise direction indicated by arrow 161c and/or in the clockwise direction in order to pivot between the milking boxes 120.

Figure 7C:
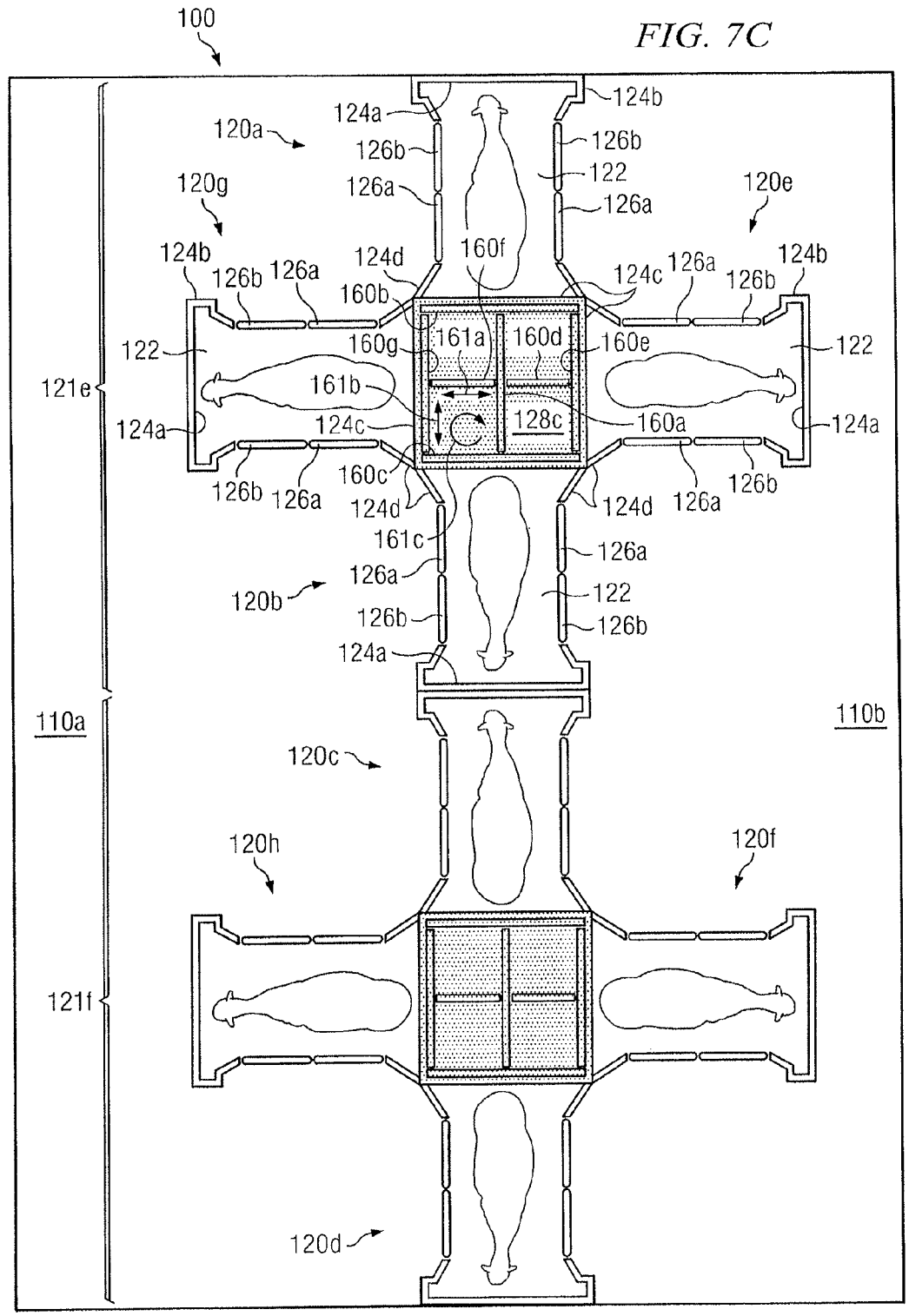

In further embodiments, a fourth milking box 120 may be added to milking box stall cluster 121, as illustrated in FIG. 7C (e.g. milking box 120g in cluster 121e and milking box 120h in cluster 121f), allowing equipment portion 128 to service all four milking boxes 120. The fourth milking box 120 may be arranged on a fourth side of equipment portion 128, such that the rear of stall portion 122 (i.e. the real wall 124c) is adjacent to the side of equipment portion 128. Thus, equipment portion 128 may have a rear of a stall portion 122 located adjacent to each of its four sides, allowing robotic attacher 150 to extend between the rear legs of a cow in any of the four milking boxes 120.

Equipment portion 128 may have a network of rails 160, allowing a robotic attacher 150 suspended from a rail 160 to move throughout the network of rails 160 and service all four milking boxes 120 in a milking box stall cluster 121. For example, as illustrated in FIG. 7C, equipment portion 128 may include rails 160a-g which may extend across the top of equipment portion 128, as discussed in connection with FIG. 3. Rail 160b may be adjacent to and oriented substantially parallel to rear wall 124c of milking box 120a. Rail 160c may be adjacent to and oriented substantially parallel to rear wall 124c of milking box 120b. Rail 160a may be oriented substantially perpendicular to rail 160b and rail 160c, and may connect rail 160b and rail 160c near their respective midpoints. Rail 160e may be adjacent to and oriented substantially parallel to rear wall 124c of milking box 120e, and may connect rail 160b and rail 160c near their respective endpoints. Rail 160d may be oriented substantially perpendicular to rail 160a and rail 160e, and may connect rail 160a and rail 160e near their respective midpoints. Rail 160g may be adjacent to and oriented substantially parallel to rear wall 124c of milking box 120g, and may connect rail 160b and rail 160c near their respective endpoints. Rail 160f may be oriented substantially perpendicular to rail 160a and rail 160g, and may connect rail 160a and rail 160g near their respective midpoints. Although rails 160a-g are depicted and primarily described as being generally formed in straight lines, this disclosure contemplates rails 160a-g with curves, or with any other suitable geometry.

Robotic attacher 150, suspended from rails 160a-g, may be configured to traverse rails 160b-c in the directions indicated by arrow 161a, and to traverse rail 160e and rail 160g in the directions indicated by arrow 161b, in order to move laterally in servicing each milking box 120. Robotic attacher 150 may also be configured to traverse rail 160a in the directions indicated by arrow 161b, and to traverse rail 160d and rail 160f in the directions indicated by arrow 161a, in order to move forward and backward between milking box 120a and milking box 120b or between milking box 120e and milking box 120g. Robotic attacher 150 may also be configured to rotate on rails 160a-g in the counter-clockwise direction indicated by arrow 161c and/or in the clockwise direction in order to pivot between the milking boxes 120.

In certain embodiments, multiple milking box stall clusters 121 may be located adjacent to one another within enclosure 100. For example, front wall 124a of a milking box 120 in a first milking box stall cluster 121 may be located adjacent to front wall 124a of another milking box 120 in a second milking box stall cluster 121, as illustrated in FIGS. 7A-7D. In the example of FIG. 7A, front wall 124a of milking box 120b in milking box stall cluster 121a is adjacent to front wall 124a of milking box 120c in milking box stall cluster 121b. In the example of FIG. 7B, front wall 124a of milking box 120b in milking box stall cluster 121c is adjacent to front wall 124a of milking box 120c in milking box stall cluster 121d. In the example of FIG. 7C, front wall 124a of milking box 120b in milking box stall cluster 121e is adjacent to front wall 124a of milking box 120c in milking box stall cluster 121f. In further embodiments, front wall 124a of each milking box 120 in a milking box stall cluster 121 is adjacent to front wall 124a of a milking box 120 in a neighboring milking box stall cluster 121, as illustrated by milking box cluster 121i in FIG. 7D.

In certain other embodiments, within an arrangement of multiple milking box stall clusters 121, various milking box stall clusters 121 may contain different numbers of milking boxes 120, or utilize different arrangements of milking boxes 120 around equipment portion 128. In further embodiments, multiple milking box stall clusters 121 may be spaced apart from one another. This disclosure contemplates any suitable arrangement of any suitable number of multiple milking box stall clusters 121, each comprising any suitable number of milking boxes 120 in any suitable arrangement around equipment portion 128.

Figure 7D:
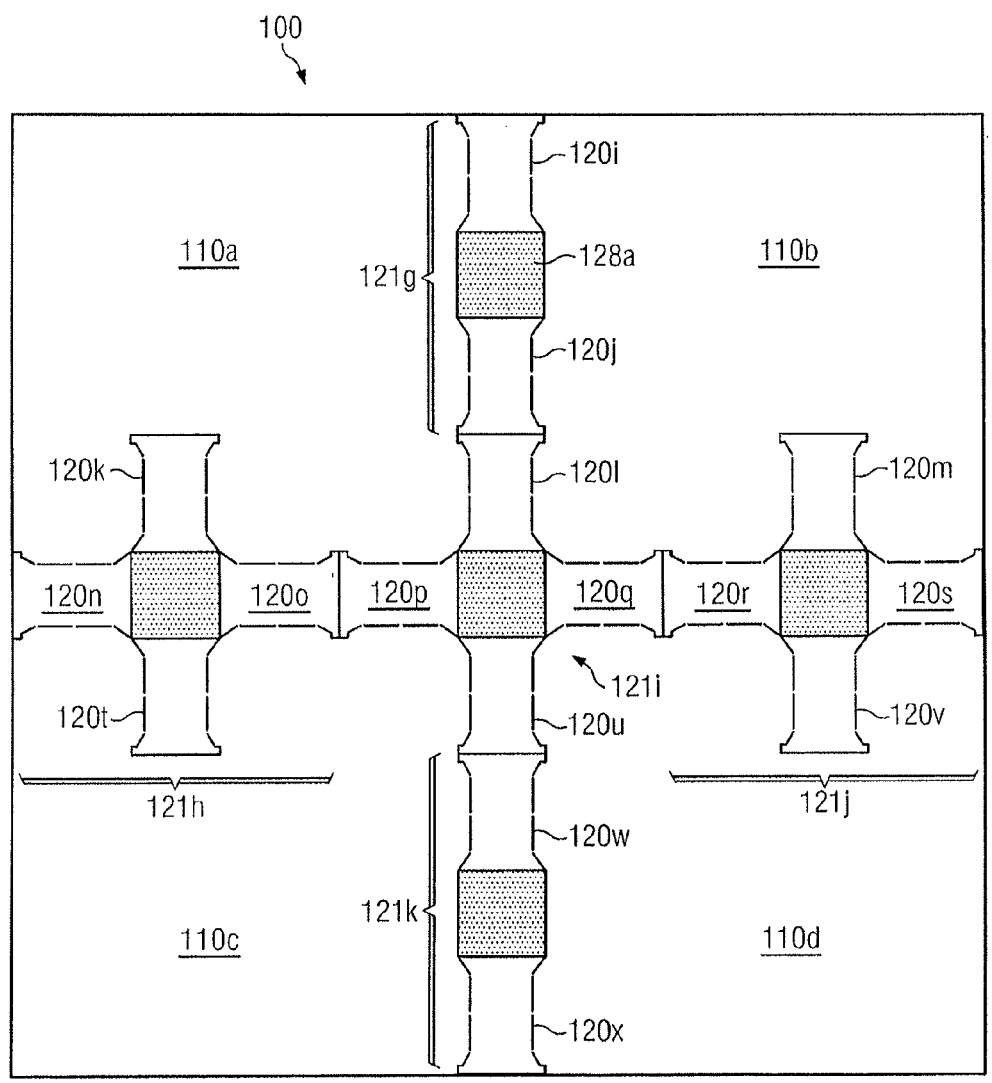

As explained in connection with FIGS. 1A-1B, adjacent milking boxes 120 may be aligned in rows in order to sort cows as they enter and exit the milking boxes 120. The same is true when adjacent milking boxes 120 may be members of different milking box stall clusters 121, as illustrated in FIGS. 7A-7D. As a result, milking boxes 120 in multiple milking box stall clusters 121 may be used to sort dairy cows into particular regions 110 by controlling the opening/closing of each gate 126 (e.g., in response to signals from a controller 200, as described above). Depending on the configuration of milking box stall clusters 121, varying numbers of regions 110 may be created. FIGS. 7A-7C illustrate example configurations of multiple milking box stall clusters 121 forming two regions 110. FIG. 7D illustrates an example configuration of multiple milking box stall clusters 121 forming four regions 110. In other embodiments, any suitable number of milking box stall clusters 121 may be arranged to form any suitable number of regions 110.

As discussed in connection with FIGS. 1A-1B and FIG. 3, controller 200 may be operable to determine the appropriate gates 126 to open and close to accomplish a desired sorting operation. Controller 200 may then communicate signals to the actuators coupled to the determined gates 126, the signals causing the gates 126 to open or close.

Because in some embodiments various milking boxes 120 may face in different directions, the appropriate gates 126 to open in order to sort a cow into an appropriate region 110 will depend upon the orientation of a particular milking box 120. Referring to FIG. 7A, for example, in order to sort a cow in milking box 120a into region 110b, exit gate 126b may open on the cow's right side. On the other hand, in order to sort a cow in milking box 120b into region 110b, exit gate 126b may open on the cow's left side, because milking box 120b faces in the opposite direction as milking box 120a, as does a cow inside each respective milking box.

In certain embodiments, an appropriate milking box 120 to use in order to sort a cow into an appropriate region 110 will depend upon the arrangement of milking boxes 120 and milking box stall clusters 121, as well as the location of a particular milking box 120 within that arrangement. Referring to FIG. 7C, for example, milking box 120g may not be used to sort a cow into region 110b, as gates 126 on both sides of milking box 120g are within region 110a. However, any of milking boxes 120a, 120b, 120c, or 120d may be used to sort a cow from region 110a into region 110b, as all four milking boxes have access to both regions.

As the number of regions 110 increase, more than one milking box 120 may be used in combination to accomplish a particular sorting operation. Referring to FIG. 7D, for example, sorting a cow from region 110a into region 110d may not be accomplished using a single milking box 120, as no milking box 120 provides access to both region 110a and region 110d. Sorting a cow from region 110a into region 11d may be accomplished by, for example, using a combination of milking box 120p, which provides access to regions 110a and 110c, and milking box 120u, which provides access to regions 110c and 110d. Other similar examples also exist.

Figure 8A:
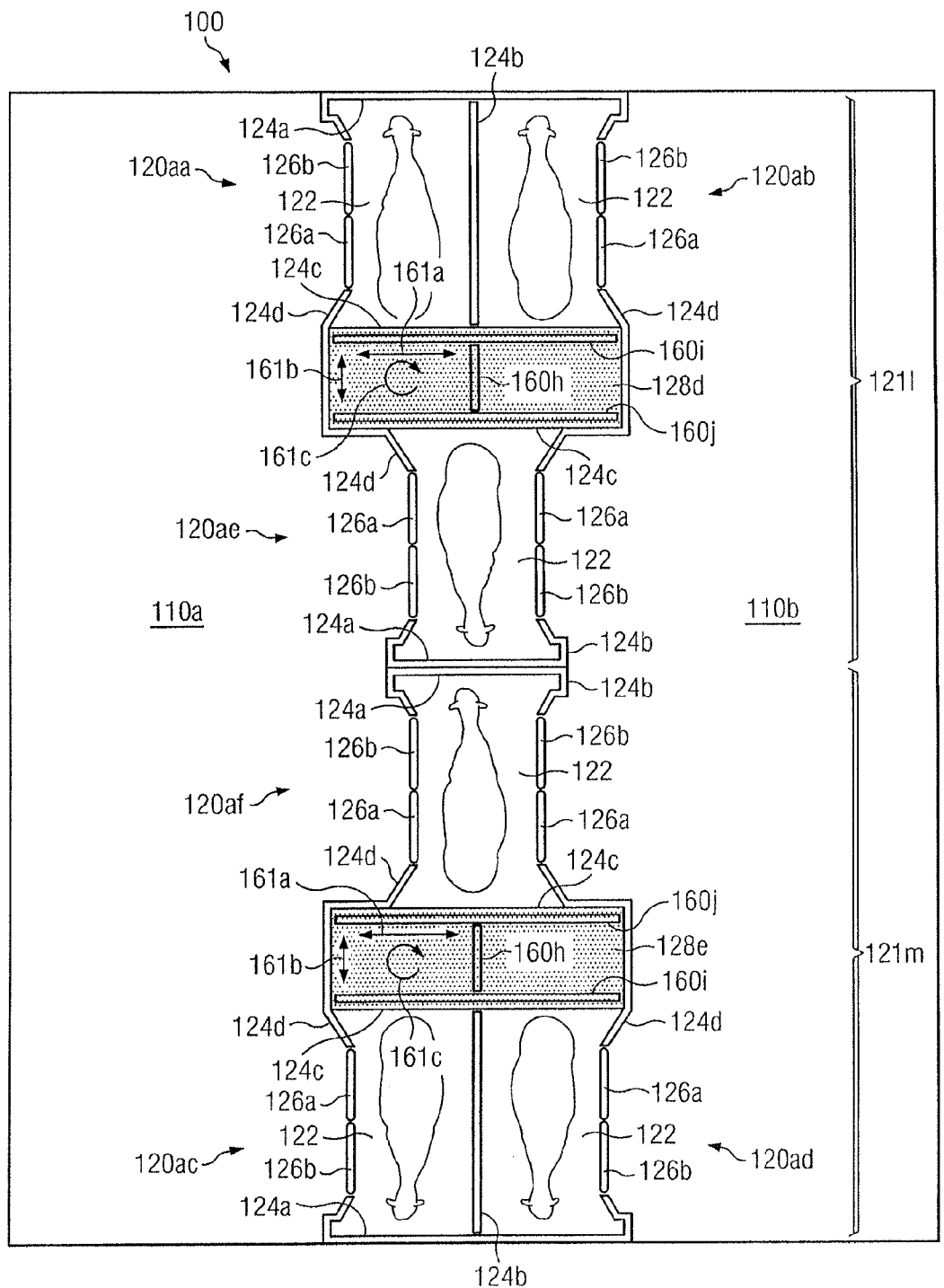
FIGS. 8A-8C illustrate additional example configurations of an enclosure in which one or more milking boxes are installed, according to certain embodiments of the present disclosure.
Figure 8B:
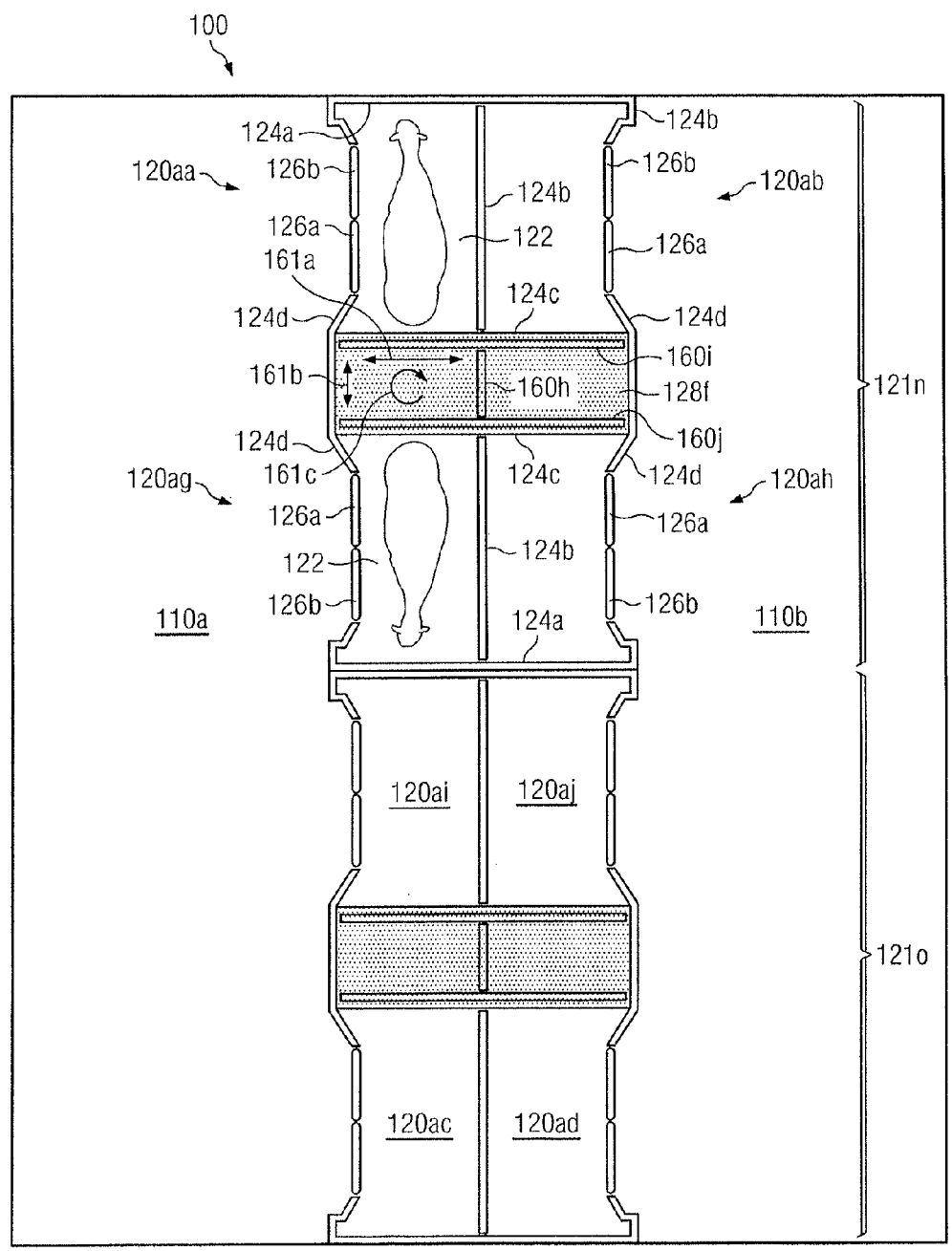
Figure 8C:
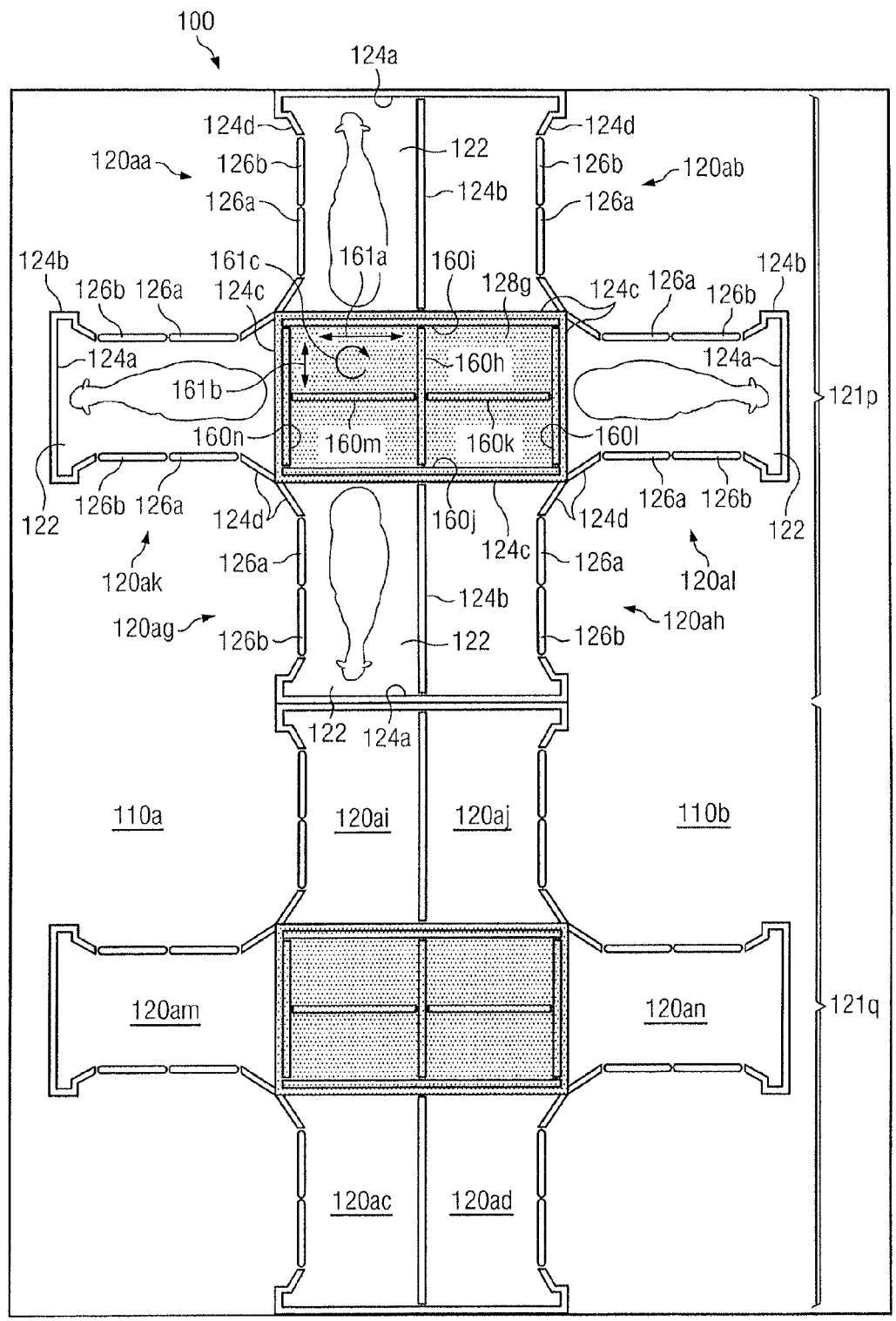

In the examples of FIGS. 7A-7D, each side of equipment portion 128 is adjacent to at most a single milking box 120. In certain other embodiments, however, two or more milking boxes 120 may be adjacent to any side of equipment portion 128. FIGS. 8A-C illustrate additional example configurations of an enclosure 100 in which one or more milking boxes 120 are arranged, according to certain embodiments of the present disclosure.

In certain embodiments, a milking box stall cluster 121 may include three milking boxes 120, as illustrated in FIG. 8A (e.g. milking boxes 120aa, 120ab, and 120ae in cluster 121l and milking boxes 120af, 120ac, and 120ad in cluster 121m). As shown in FIG. 8A, a first and second milking box (e.g. milking boxes 120aa and 120ab) may be arranged on the opposite side of equipment portion 128 from a third milking box (e.g., milking box 120ae), such that the rear of each stall portion 122 (i.e. the rear wall 124c) is adjacent to the side of equipment portion 128. The first and second milking box may be adjacent to one another and may share a wall 124 (e.g. wall 124b). Therefore, when a cow is present in any of the three milking boxes 120, the cow's rear legs will be situated near equipment portion 128, allowing robotic attacher 150 to extend between the rear legs of the cow.

As described in connection with FIG. 3, in certain embodiments robotic attacher 150 may be suspended into equipment portion 128 from a rail 160. In further embodiments, equipment portion 128 may have a network of rails 160, allowing a robotic attacher 150 suspended from a rail 160 to move throughout the network of rails 160 and service all milking boxes 120 in a milking box stall cluster 121. For example, as illustrated in FIG. 8A, equipment portion 128 may include rails 160h-j, which may extend across the top of equipment portion 128, as discussed in connection with FIG. 3. Rail 160*i* may be adjacent to and oriented substantially parallel to rear wall 124*c* of milking box 120*aa* and milking box 120*ab*. Rail 160*j* may be adjacent to and oriented substantially parallel to rear wall 124*c* of milking box 120*ae*. Rail 160*h* may be oriented substantially perpendicular to rail 160*i* and rail 160*j* and may connect rail 160*i* and rail 160*j* near their respective midpoints. Although rails 160*h-j* are depicted and primarily described as being generally formed in straight lines, this disclosure contemplates rails 160*h-j* with curves, or with any other suitable geometry.

Robotic attacher 150, suspended from rails 160*h-j*, may be configured to traverse rails 160*i-j* in the directions indicated by arrow 161*a* in order to move laterally in servicing each milking box 120. Robotic attacher 150 may also be configured to traverse rail 160*i* in the directions indicated by arrow 161*a* in order to move between milking box 120*aa* and milking box 120*ab*. Robotic attacher 150 may also be configured to traverse rail 160*h* in the directions indicated by arrow 161*b* in order to move forward and backward between milking boxes 120*aa* and 120*ab* and milking box 120*ae*. Robotic attacher 150 may also be configured to rotate on rails 160*h-j* in the counter-clockwise direction indicated by arrow 161*c* and/or in the clockwise direction in order to pivot between the milking boxes 120.

In the example of FIG. 8A, front wall 124*a* of milking box 120*ae* in milking box stall cluster 121*l* is adjacent to front wall 124*a* of milking box 120*af* in milking box stall cluster 121*m*. Alternatively, milking box stall clusters 121*l-m* could be arranged so that front walls 124*a* of milking box 120*aa* and milking box 120*ab* in milking box stall cluster 121*l* are adjacent to front walls 124*a* of milking box 120*ac* and milking box 120*ad* in milking box stall cluster 121*m*, respectively. Likewise, milking box stall clusters 121*l-m* could be arranged so that front wall 124*a* of milking box 120*ae* in milking box stall cluster 121*l* is adjacent to front walls 124*a* of milking box 120*ac* and milking box 120*ad* in milking box stall cluster 121*m*.

In certain other embodiments, a milking box stall cluster 121 may include four milking boxes 120, as illustrated in FIG. 8B (e.g. milking boxes 120*aa*, 120*ab*, 120*ag*, and 120*ah* in cluster 121*n* and milking boxes 120*ai*, 120*aj*, 120*ac*, and 120*ad* in cluster 121*o*). As shown in FIG. 8B, a first and second milking box (e.g. milking boxes 120*aa* and 120*ab*) may be arranged on the opposite side of equipment portion 128 from a third and fourth milking box (e.g. milking boxes 120*ag* and 120*ah*), such that the rear of each stall portion 122 (i.e. the rear wall 124*c*) is adjacent to the side of equipment portion 128. The first and second milking box may be adjacent to one another and may share a wall 124 (e.g. wall 124*b*). Likewise, the third and fourth milking box may be adjacent to one another and may share a wall 124. Therefore, when a cow is present in any of the four milking boxes 120, the cow's rear legs will be situated near equipment portion 128, allowing robotic attacher 150 to extend between the rear legs of the cow.

Equipment portion 128 may have a network of rails 160, allowing a robotic attacher 150 suspended from a rail 160 to move throughout the network of rails 160 and service all four milking boxes 120 in a milking box stall cluster 121. For example, as illustrated in FIG. 8B, equipment portion 128 may include rails 160*h-j* which may extend across the top of equipment portion 128, as discussed in connection with FIG. 3. Rail 160*i* may be adjacent to and oriented substantially parallel to rear wall 124*c* of milking box 120*aa* and milking box 120*ab*. Rail 160*j* may be adjacent to and oriented substantially parallel to rear wall 124*c* of milking box 120*ag* and milking box 120*ah*. Rail 160*h* may be oriented substantially perpendicular to rail 160*i* and rail 160*j* and may connect rail 160*i* and rail 160*j* near their respective midpoints. Although rails 160*h-j* are depicted and primarily described as being generally formed in straight lines, this disclosure contemplates rails 160*h-j* with curves, or with any other suitable geometry.

Robotic attacher 150, suspended from rails 160*h-j*, may be configured to traverse rails 160*i-j* in the directions indicated by arrow 161*a* in order to move laterally in servicing each milking box 120. Robotic attacher 150 may also be configured to traverse rail 160*i* in the directions indicated by arrow 161*a* in order to move between milking box 120*aa* and milking box 120*ab*, and to traverse rail 160*j* in the directions indicated by arrow 161*a* in order to move between milking box 120*ag* and milking box 120*ah*. Robotic attacher 150 may also be configured to traverse rail 160*h* in the directions indicated by arrow 161*b* in order to move forward and backward between milking boxes 120*aa* and 120*ab* and milking boxes 120*ag* and 120*ah*. Robotic attacher 150 may also be configured to rotate on rails 160*h-j* in the counter-clockwise direction indicated by arrow 161*c* and/or in the clockwise direction in order to pivot between the milking boxes 120.

In further embodiments, a fifth and sixth milking box 120 may be added to milking box stall cluster 121, as illustrated in FIG. 8C (e.g. milking boxes 120*ak* and 120*al* in cluster 121*p* and milking boxes 120*am* and 120*an* in cluster 121*q*), allowing equipment portion 128 to service all six milking boxes 120. The fifth and six milking boxes 120 may be arranged opposite one another on a third and fourth side of equipment portion 128, such that the rear of each stall portion 122 (i.e. the real wall 124*c*) is adjacent to the side of equipment portion 128. Thus, equipment portion 128 may have a rear of one or more stall portions 122 located adjacent to each of its four sides, allowing robotic attacher 150 to extend between the rear legs of a cow in any of the six milking boxes 120.

Equipment portion 128 may have a network of rails 160, allowing a robotic attacher 150 suspended from a rail 160 to move throughout the network of rails 160 and service all six milking boxes 120 in a milking box stall cluster 121. For example, as illustrated in FIG. 8C, equipment portion 128 may include rails 160*h-n* which may extend across the top of equipment portion 128, as discussed in connection with FIG. 3. Rail 160*i* may be adjacent to and oriented substantially parallel to rear wall 124*c* of milking box 120*aa* and milking box 120*ab*. Rail 160*j* may be adjacent to and oriented substantially parallel to rear wall 124*c* of milking box 120*ag* and milking box 120*ah*. Rail 160*h* may be oriented substantially perpendicular to rail 160*i* and rail 160*j* and may connect rail 160*i* and rail 160*j* near their respective midpoints. Rail 160*l* may be adjacent to and oriented substantially parallel to rear wall 124*c* of milking box 120*al*, and may connect rail 160*i* and rail 160*j* near their respective endpoints. Rail 160*k* may be oriented substantially perpendicular to rail 160*h* and rail 160*l*, and may connect rail 160*h* and rail 160*l* near their respective midpoints. Rail 160*n* may be adjacent to and oriented substantially parallel to rear wall 124*c* of milking box 120*ak*, and may connect rail 160*i* and rail 160*j* near their respective endpoints. Rail 160*m* may be oriented substantially perpendicular to rail 160*h* and rail 160*n*, and may connect rail 160*h* and rail 160*n* near their respective midpoints. Although rails 160*h-n* are depicted and primarily described as being generally formed in straight lines, this disclosure contemplates rails 160*h-n* with curves, or with any other suitable geometry.

Robotic attacher 150, suspended from rails 160*h-n*, may be configured to traverse rails 160*i-j* in the directions indicated by arrow 161*a*, and to traverse rails 160*l* and 160*n* in the directions indicated by arrow 161*b*, in order to move laterally in servicing each milking box 120. Robotic attacher 150 may also be configured to traverse rail 160*i* in the directions indicated by arrow 161*a* in order to move between milking box 120*aa* and milking box 120*ab*, and to traverse rail 160*j* in the directions indicated by arrow 161*a* in order to move between milking box 120*ag* and milking box 120*ah*. Robotic attacher 150 may also be configured to traverse rail 160*h* in the directions indicated by arrow 161*b* in order to move forward and backward between milking boxes 120*aa* and 120*ab* and milking boxes 120*ag* and 120*ah*. Robotic attacher 150 may also be configured to traverse rails 160*k* and 160*m* in the directions indicated by arrow 161*a* in order to move forward and backward between milking box 120*al* and milking box 120*ak*. Robotic attacher 150 may also be configured to rotate on rails 160*h-n* in the counter-clockwise direction indicated by arrow 161*c* and/or in the clockwise direction in order to pivot between the milking boxes 120.

In further embodiments, a seventh and eighth milking box 120 may be added to a milking box cluster 121 by arranging the additional milking boxes such that each side of equipment portion 128 is adjacent to two milking boxes 120. In the example of milking box cluster 121*q* of FIG. 8C, a seventh milking box 120 may be arranged adjacent to milking box 120*am*, and an eighth milking box 120 may be arranged adjacent to milking box 120*an*, such that the rear of each stall portion 122 (i.e. the real wall 124*c*) is adjacent to a side of equipment portion 128. Thus, equipment portion 128 may have the rears of two stall portions 122 located adjacent to each of its four sides, allowing robotic attacher 150 to extend between the rear legs of a cow in any of the eight milking boxes 120. The sides of equipment portion 128 adjacent to milking boxes 120*am* and 120*an* may need to be longer in order to accommodate the addition of the seventh and eighth milking box 120.

Figure 9:
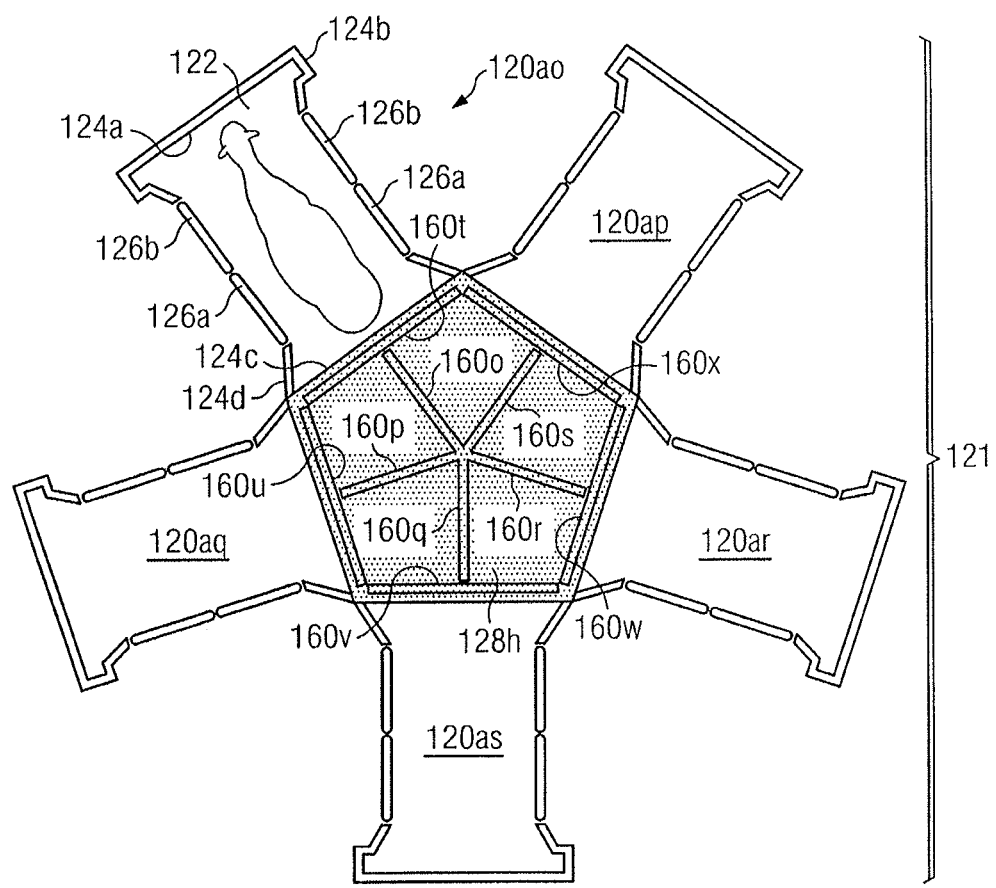
FIG. 9 illustrates an example milking box stall cluster with a pentagonal equipment portion, having five sides, according to certain embodiments of the present disclosure.

Although in the preceding discussion, equipment portion 128 is depicted and primarily described as having a generally rectangular shape with four sides, the present disclosure contemplates the equipment portion 128 having any suitable shape with any suitable number of sides, according to particular needs. FIG. 9 illustrates an example milking box stall cluster 121 with a pentagonal equipment portion 128*h*, having five sides, according to certain embodiments of the present disclosure. Five milking boxes 120 are arranged around equipment portion 128*h*, such that the rear of a milking box stall portion 122 is located adjacent to each of the five sides of equipment portion 128*h*, allowing robotic attacher 150 to extend between the rear legs of a cow in any of the five milking boxes 120.

Equipment portion 128*h* may have a network of rails 160*o-x*, allowing a robotic attacher 150 suspended from a rail 160 to move throughout the network of rails 160 and service all five milking boxes 120. Rail 160*t* may be adjacent to and oriented substantially parallel to rear wall 124*c* of milking box 120*ao*. Rail 160*u* may be adjacent to and oriented substantially parallel to rear wall 124*c* of milking box 120*aq*. Rail 160*v* may be adjacent to and oriented substantially parallel to rear wall 124*c* of milking box 120*as*. Rail 160*w* may be adjacent to and oriented substantially parallel to rear wall 124*c* of milking box 120*ar*. Rail 160*x* may be adjacent to and oriented substantially parallel to rear wall 124*c* of milking box 120*ap*. Rails 160*t-x* may be interconnected: rail 160*t* may share an endpoint with rails 160*u* and 160*x*; rail 160*u* may share an endpoint with rails 160*t* and 160*v*; rail 160*v* may share an endpoint with rails 160*u* and 160*w*; rail 160*w* may share an endpoint with rails 160*v* and 160*x*; and rail 160*x* may share an endpoint with rails 160*w* and 160*t*. Rails 160*o-s* may all share a common endpoint in the center of equipment portion 128*h* and extend radially outward toward rails 160*t-x*. The other end of rails 160*o-s* may connect to rails 160*t-x* near the midpoint of rails 160*t-x*: rail 160*o* may connect to rail 160*t* near its midpoint; rail 160*p* may connect to rail 160*u* near its midpoint; rail 160*q* may connect to rail 160*v* near its midpoint; rail 160*r* may connect to rail 160*w* near its midpoint; and rail 160*s* may connect to rail 160*x* near its midpoint. Although rails 160*o-x* are depicted and primarily described as being generally formed in straight lines, this disclosure contemplates rails 160*o-x* with curves, or with any other suitable geometry.

Robotic attacher 150, suspended from rails 160*o-x*, may be configured to traverse rails 160*t-x* in order to move laterally in servicing each milking box 120, or in order to move laterally between milking boxes 120. Robotic attacher 150 may also be configured to traverse rails 160*o-s* in order to move forward and backward between the center of the equipment portion 128*h* and any of the milking boxes 120. Robotic attacher 150 may also be configured to rotate on rails 160*o-x* in a counter-clockwise direction and/or a clockwise direction in order to pivot between the milking boxes 120.

Modifications, additions, or omissions may be made to the systems described herein without departing from the scope of the invention. The components may be integrated or separated. Moreover, the operations may be performed by more, fewer, or other components. Additionally, the operations may be performed using any suitable logic comprising software, hardware, and/or other logic. As used in this document, "each" refers to each member of a set or each member of a subset of a set.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system, comprising:
   a first milking box stall of a size sufficient to accommodate a first dairy livestock;
   a second milking box stall of a size sufficient to accommodate a second dairy livestock, wherein the first and second milking box stalls face opposite directions;
   an equipment portion located between the first milking box stall and the second milking box stall; and
   a robotic attacher housed in the equipment portion and configured to service both stalls at different times.

2. The system of claim 1, wherein the equipment portion and the milking box stalls define a first milking box stall cluster, and the system comprises a second milking box cluster comprising a plurality of milking box stalls serviced by a second robotic attacher.

3. The system of claim 1, wherein the robotic attacher:
- extends, during a first time period, between the rear legs of the first dairy livestock located in the first milking box stall in order to attach milking equipment to the dairy livestock; and
- extends, during a second time period, between the rear legs of the second dairy livestock located in the second milking box stall in order to attach milking equipment to the second dairy livestock.

4. The system of claim 1, wherein the robotic attacher moves between the first milking box stall and the second milking box stall in order to service both stalls, the movement comprising one or more of:
- pivoting between the first milking box stall and the second milking box stall;
- moving laterally between the first milking box stall and the second milking box stall; and
- moving forward and backward between the first milking box stall and the second milking box stall.

5. The system of claim 1, further comprising a third milking box stall located adjacent to the equipment portion, and wherein the robotic attacher is further configured to service the third milking box stall.

6. The system of claim 5, wherein the robotic attacher:
- extends, during a first time period, between the rear legs of the first dairy livestock located in the first milking box stall in order to attach milking equipment to the dairy livestock;
- extends, during a second time period, between the rear legs of the second dairy livestock located in the second milking box stall in order to attach milking equipment to the second dairy livestock; and
- extends, during a third time period, between the rear legs of a third dairy livestock located in the third milking box stall in order to attach milking equipment to the third dairy livestock.

7. A system, comprising:
- a first milking box stall of a size sufficient to accommodate a first dairy livestock;
- an equipment portion located adjacent to the first milking box stall;
- a second milking box stall of a size sufficient to accommodate a second dairy livestock, the second milking box stall located adjacent to the equipment portion; and
- a robotic attacher housed in the equipment portion and configured to service both stalls at different times.

8. The system of claim 7, wherein the equipment portion and the milking box stalls define a first milking box stall cluster, and the system comprises a second milking box cluster comprising a plurality of milking box stalls serviced by a second robotic attacher.

9. The system of claim 8, wherein the robotic attacher moves between the first milking box stall and the second milking box stall in order to service both stalls, the movement comprising one or more of:
- pivoting between the first milking box stall and the second milking box stall;
- moving laterally between the first milking box stall and the second milking box stall; and
- moving forward and backward between the first milking box stall and the second milking box stall.

10. The system of claim 8, further comprising a third milking box stall located adjacent to the equipment portion, and wherein the robotic attacher is further configured to service the third milking box stall.

11. The system of claim 10, wherein the robotic attacher:
- extends, during a first time period, between the rear legs of the first dairy livestock located in the first milking box stall in order to attach milking equipment to the dairy livestock;
- extends, during a second time period, between the rear legs of the second dairy livestock located in the second milking box stall in order to attach milking equipment to the second dairy livestock; and
- extends, during a third time period, between the rear legs of a third dairy livestock located in the third milking box stall in order to attach milking equipment to the third dairy livestock.

12. The system of claim 7, wherein the robotic attacher:
- extends, during a first time period, between the rear legs of the first dairy livestock located in the first milking box stall in order to attach milking equipment to the dairy livestock; and
- extends, during a second time period, between the rear legs of the second dairy livestock located in the second milking box stall in order to attach milking equipment to the second dairy livestock.

13. A method for performing milking operations, comprising:
- extending, during a first time period, a robotic attacher between the rear legs of a first dairy livestock located in a first milking box stall in order to attach milking equipment to the first dairy livestock;
- moving the robotic attacher from the first milking box stall to the second box stall; and
- extending, during a second time period, the robotic attacher between the rear legs of a second dairy livestock located in a second milking box stall in order to attach milking equipment to the second dairy livestock, wherein the second milking box stall faces a different direction than the first milking box stall.

14. The method of claim 13, wherein moving the robotic attacher comprises one or more of:
- pivoting between the first milking box stall and the second milking box stall;
- moving laterally between the first milking box stall and the second milking box stall; and
- moving forward and backward between the first milking box stall and the second milking box stall.

15. The method of claim 13, further comprising:
- moving the robotic attacher from either of the first milking box stall or the second milking box stall to a third milking box stall; and
- extending, during a third time period, the robotic attacher between the rear legs of a third dairy livestock located in a third milking box stall in order to attach milking equipment to the third dairy livestock, wherein the third milking box stall faces a different direction than at least one of the first milking box stall and the second milking box stall.

* * * * *